(12) United States Patent
Nakano et al.

(10) Patent No.: US 10,199,868 B2
(45) Date of Patent: Feb. 5, 2019

(54) POWER RECEIVER, NON-CONTACT POWER TRANSMISSION SYSTEM, AND METHOD OF CONTROLLING RECEIVED-POWER VOLTAGE

(71) Applicant: SONY CORPORATION, Tokyo (JP)

(72) Inventors: Hiroaki Nakano, Tokyo (JP); Keigo Bunsen, Tokyo (JP); Takaaki Hashiguchi, Tokyo (JP); Osamu Kozakai, Kanagawa (JP); Kenichi Fujimaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 388 days.

(21) Appl. No.: 14/759,987

(22) PCT Filed: Dec. 24, 2013

(86) PCT No.: PCT/JP2013/007541
§ 371 (c)(1),
(2) Date: Jul. 9, 2015

(87) PCT Pub. No.: WO2014/112019
PCT Pub. Date: Jul. 24, 2014

(65) Prior Publication Data
US 2015/0340881 A1 Nov. 26, 2015

(30) Foreign Application Priority Data
Jan. 16, 2013 (JP) .................... 2013-005556

(51) Int. Cl.
H02J 50/12 (2016.01)
H02J 50/80 (2016.01)
H02J 7/02 (2016.01)
H02J 7/04 (2006.01)
H02J 7/00 (2006.01)

(52) U.S. Cl.
CPC ............ *H02J 50/12* (2016.02); *H02J 7/025* (2013.01); *H02J 7/045* (2013.01); *H02J 50/80* (2016.02); *H02J 7/047* (2013.01); *H02J 2007/0096* (2013.01)

(58) Field of Classification Search
CPC ................................. H02J 5/005; H02J 7/025
USPC ......................................................... 307/104
See application file for complete search history.

(56) References Cited

U.S. PATENT DOCUMENTS

| 2008/0164839 | A1* | 7/2008 | Kato | H02J 7/025 320/108 |
| 2012/0223590 | A1* | 9/2012 | Low | H02J 5/005 307/104 |
| 2012/0235500 | A1* | 9/2012 | Ganem | H03H 7/40 307/104 |

* cited by examiner

Primary Examiner — Alfonso Perez Borroto
(74) Attorney, Agent, or Firm — Chip Law Group

(57) ABSTRACT

A device configured to receive power (20B), the device comprising a coil (21L) having a resistance, and at least one circuit (30) configured to calculate a target voltage value based on an amount of power received by the device and the resistance of the coil, and control received power voltage based on the calculated target voltage value.

19 Claims, 11 Drawing Sheets

[FIG. 1]
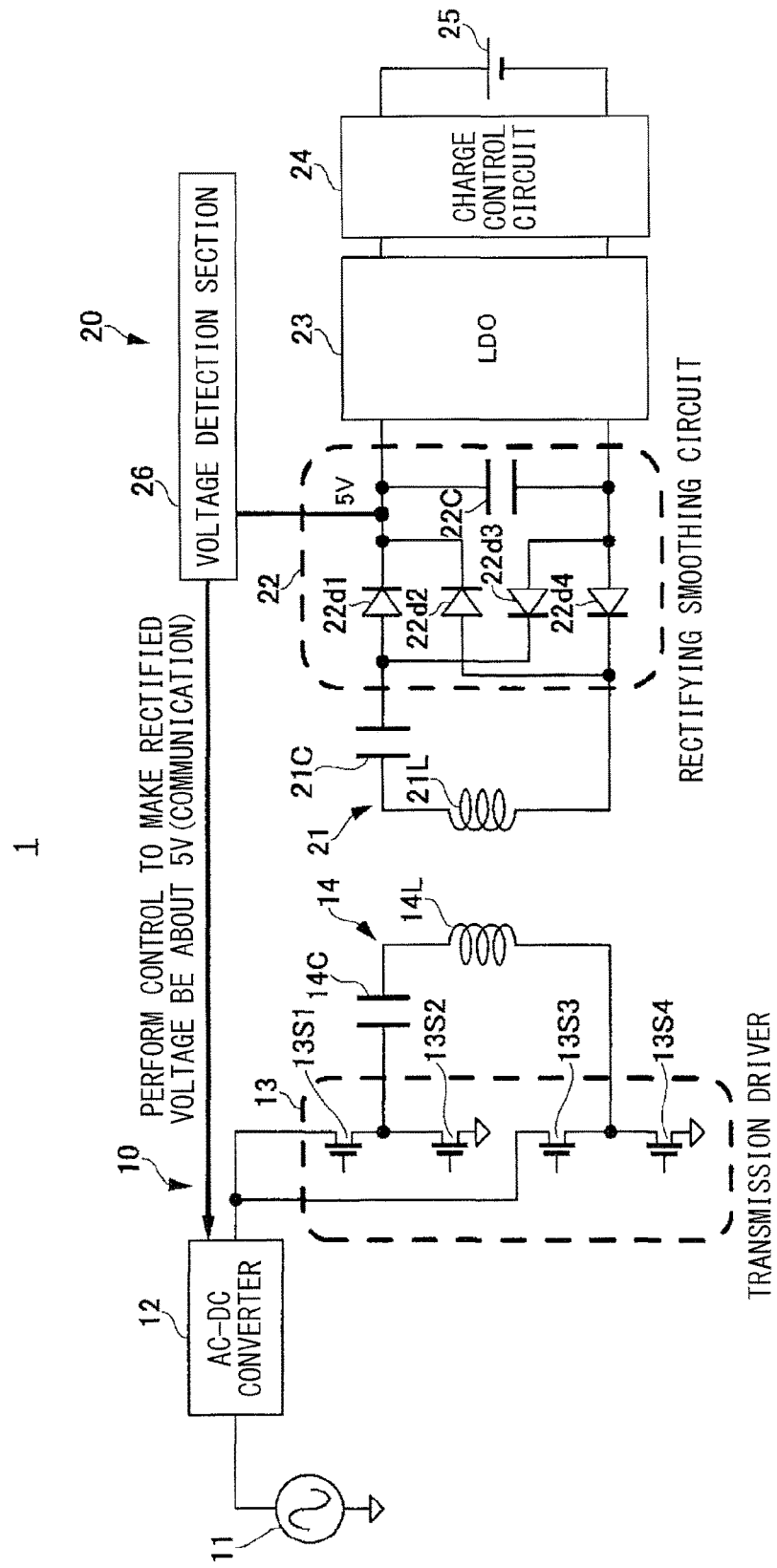

[ FIG. 2 ]
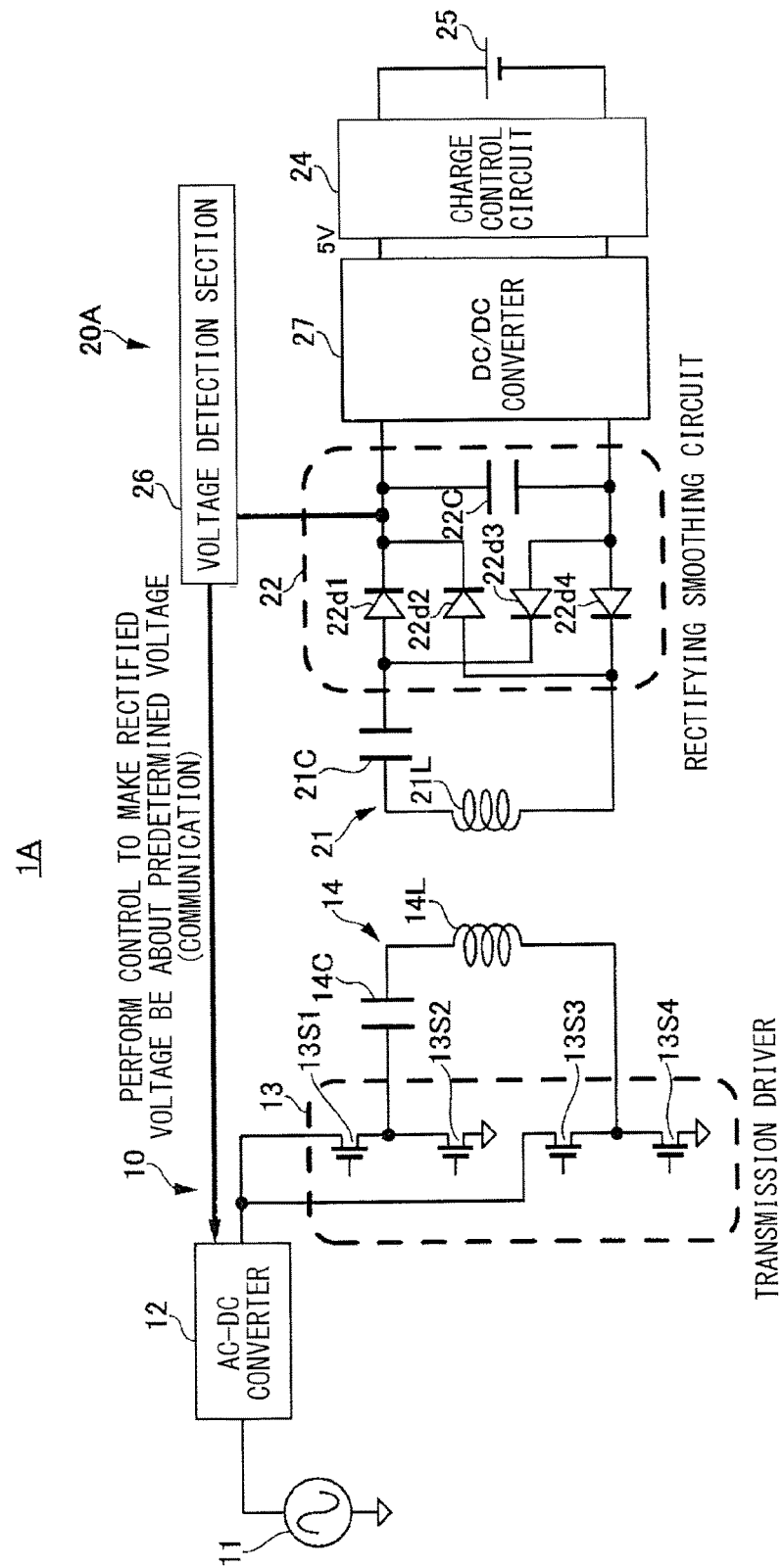

[ FIG. 3 ]
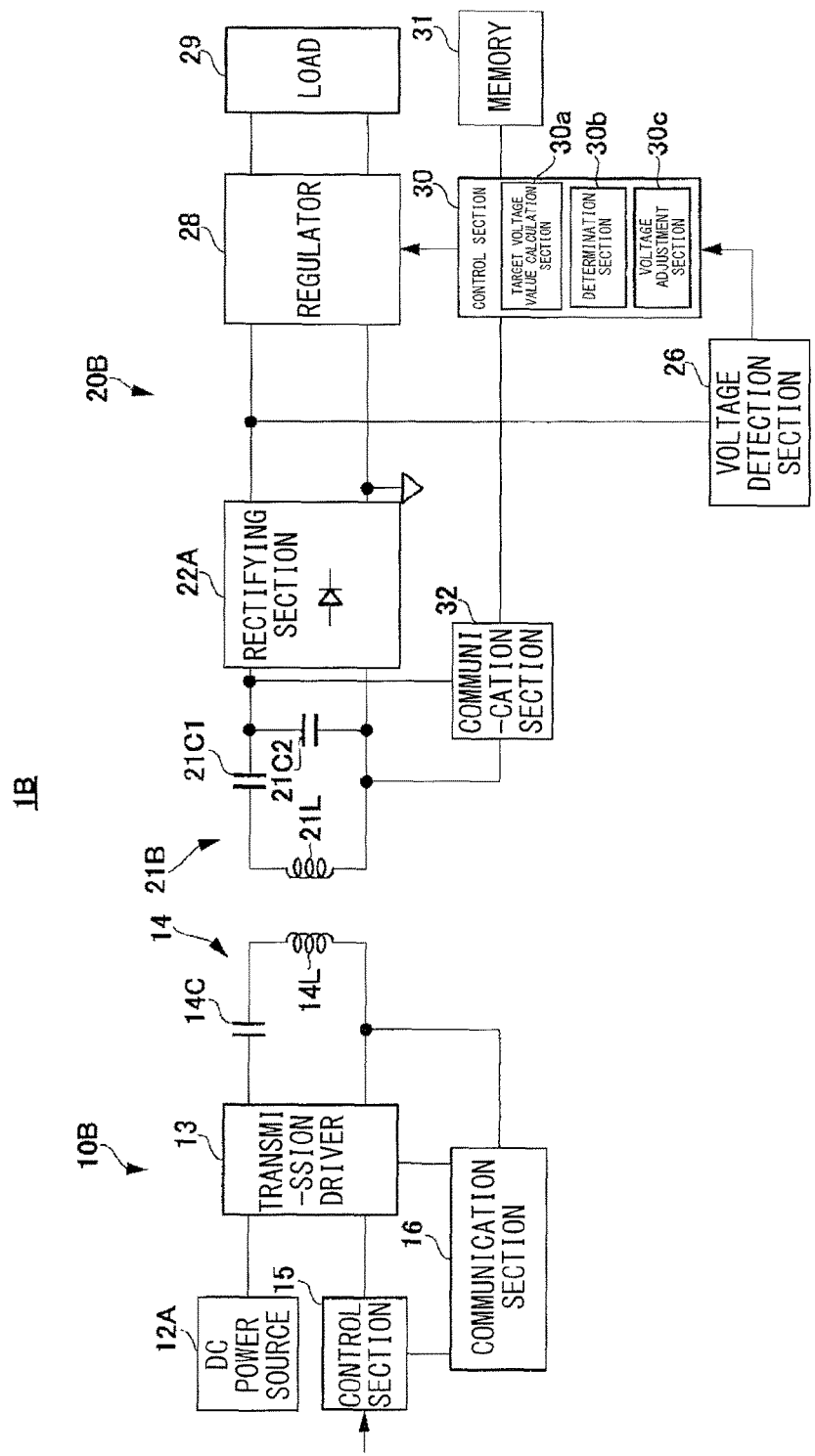

[ FIG. 4 ]
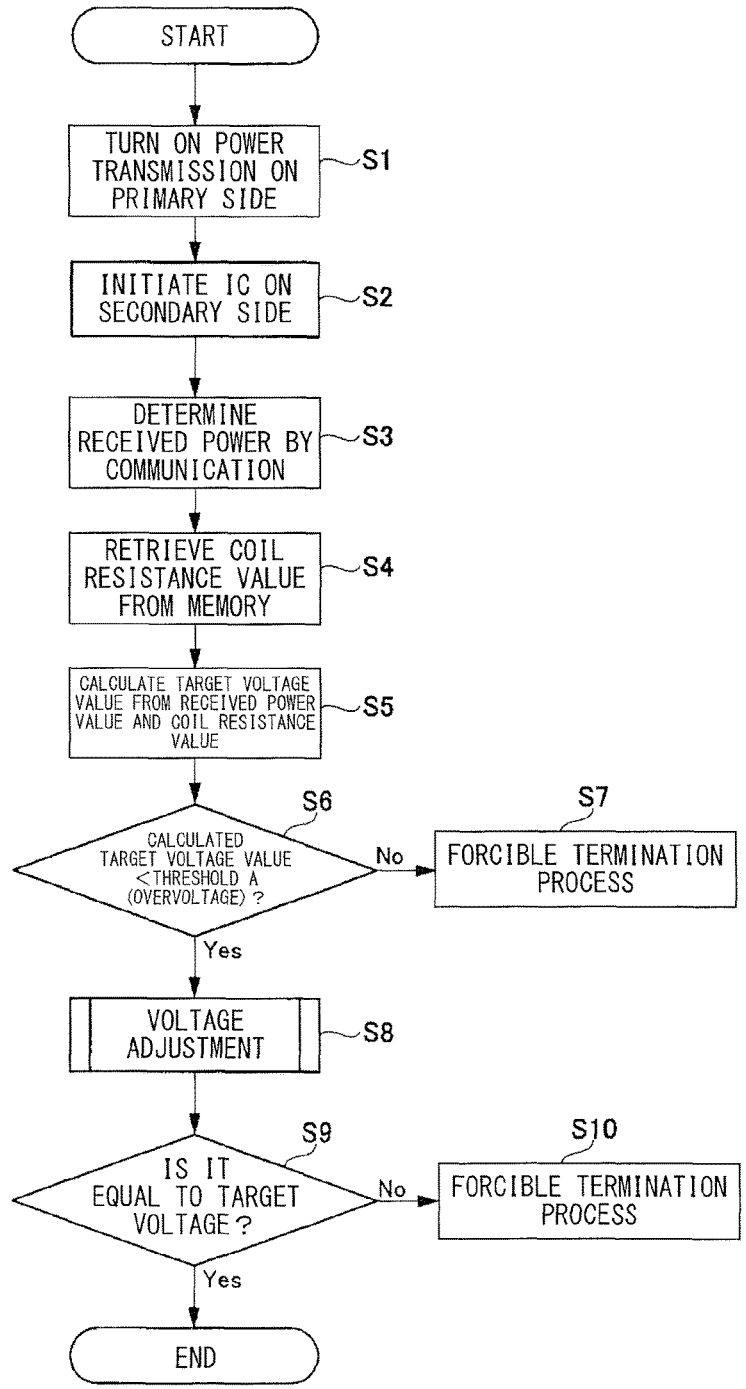

[ FIG. 5 ]
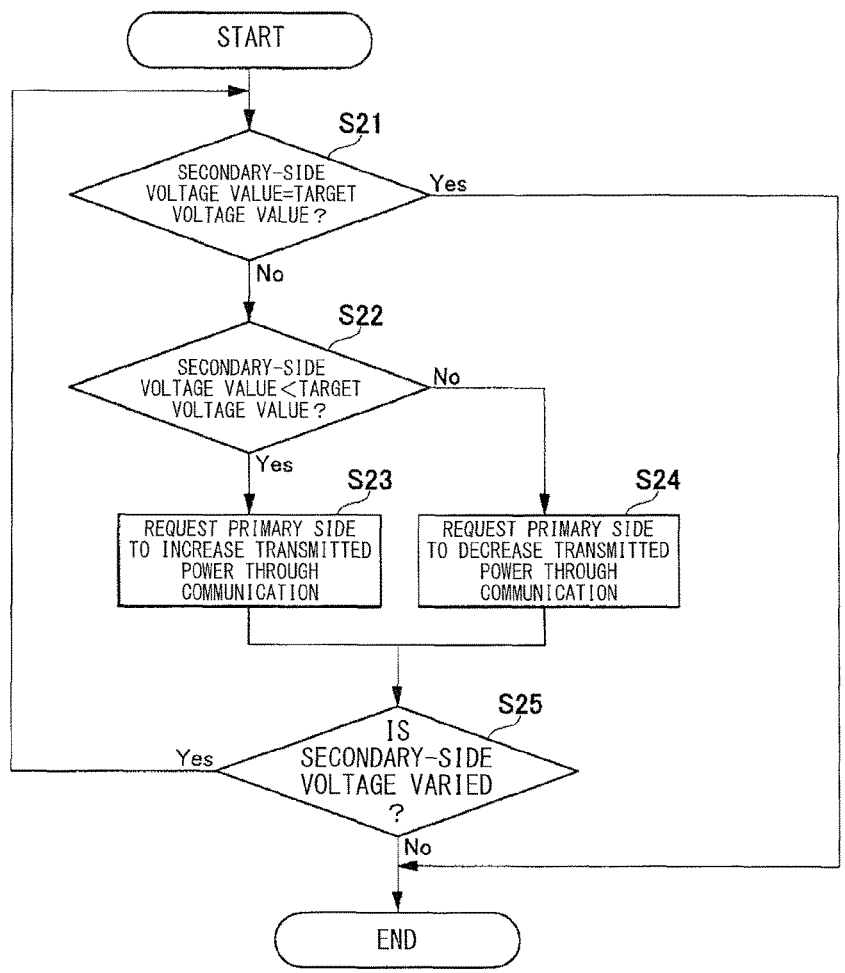

[FIG.6]
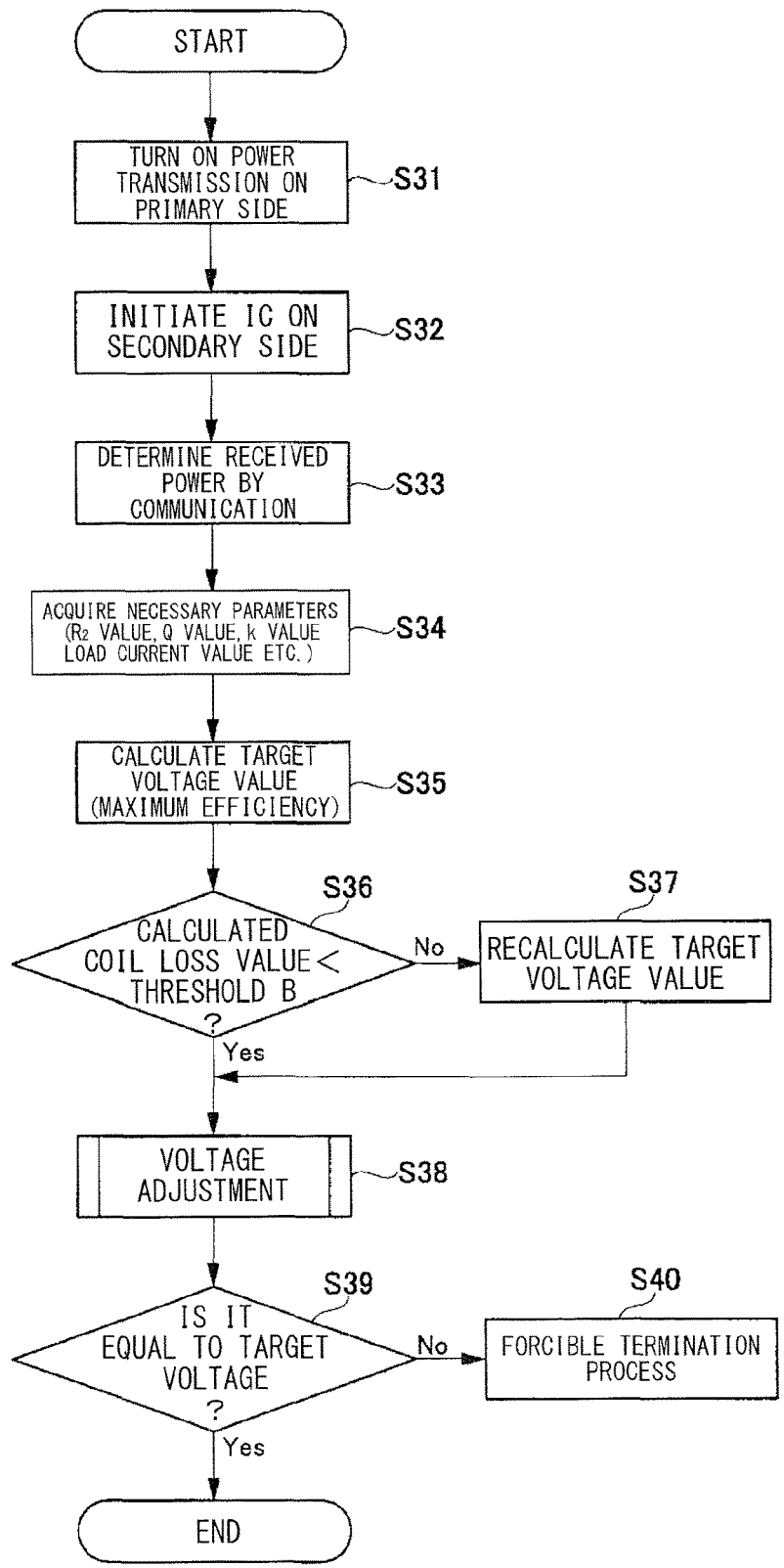

[ FIG. 7 ]
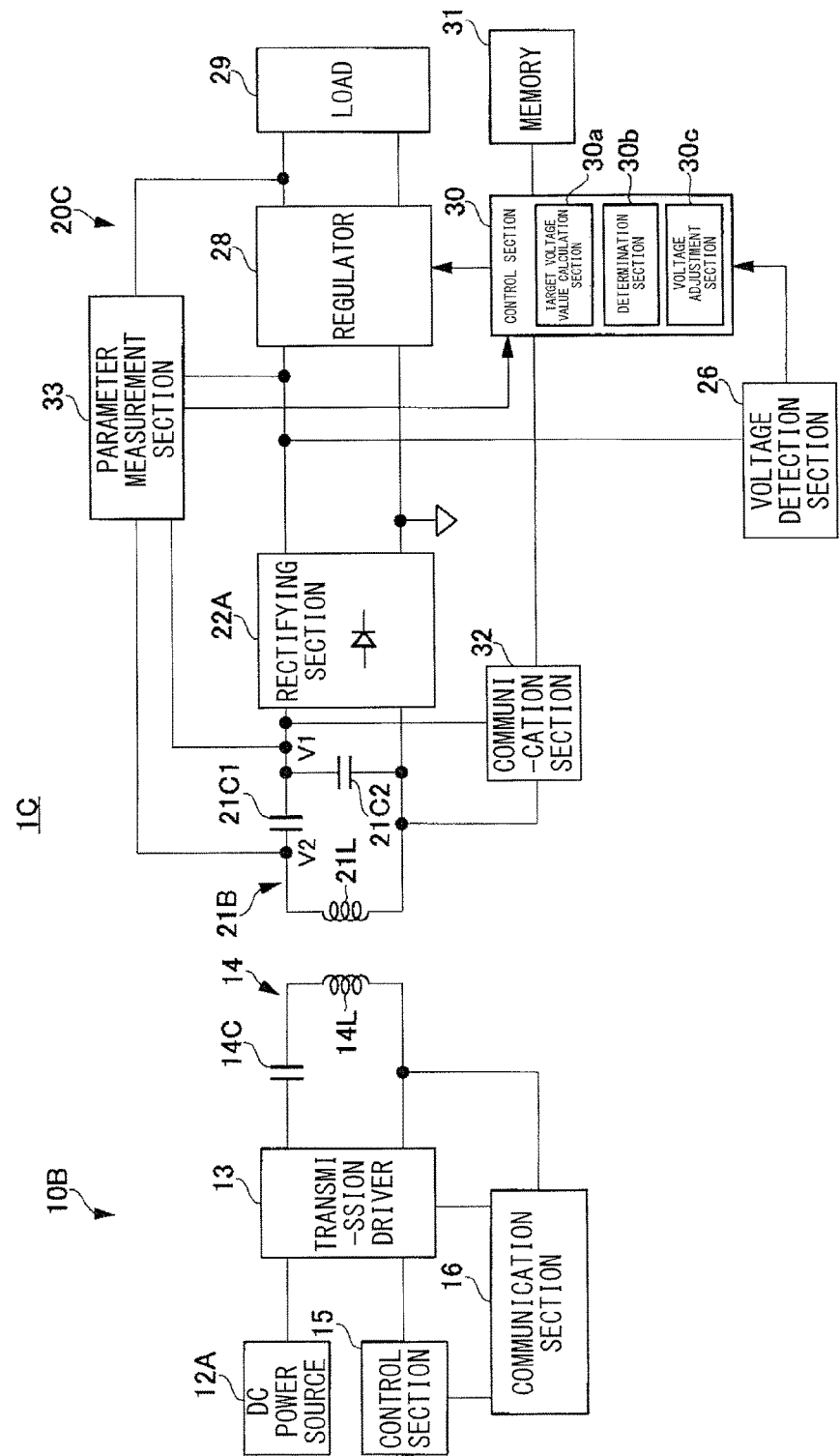

[FIG. 8]
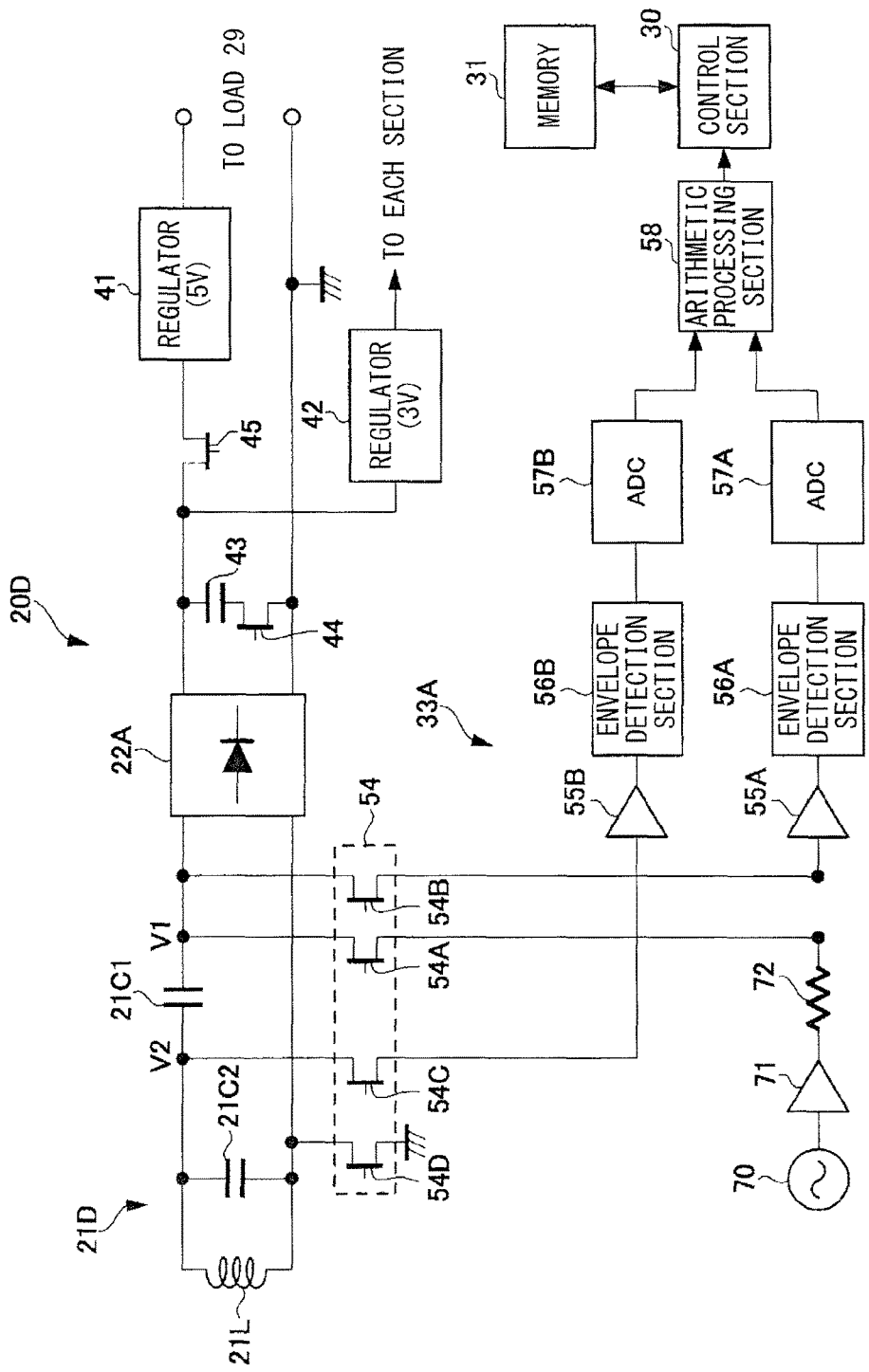

[ FIG. 9 ]
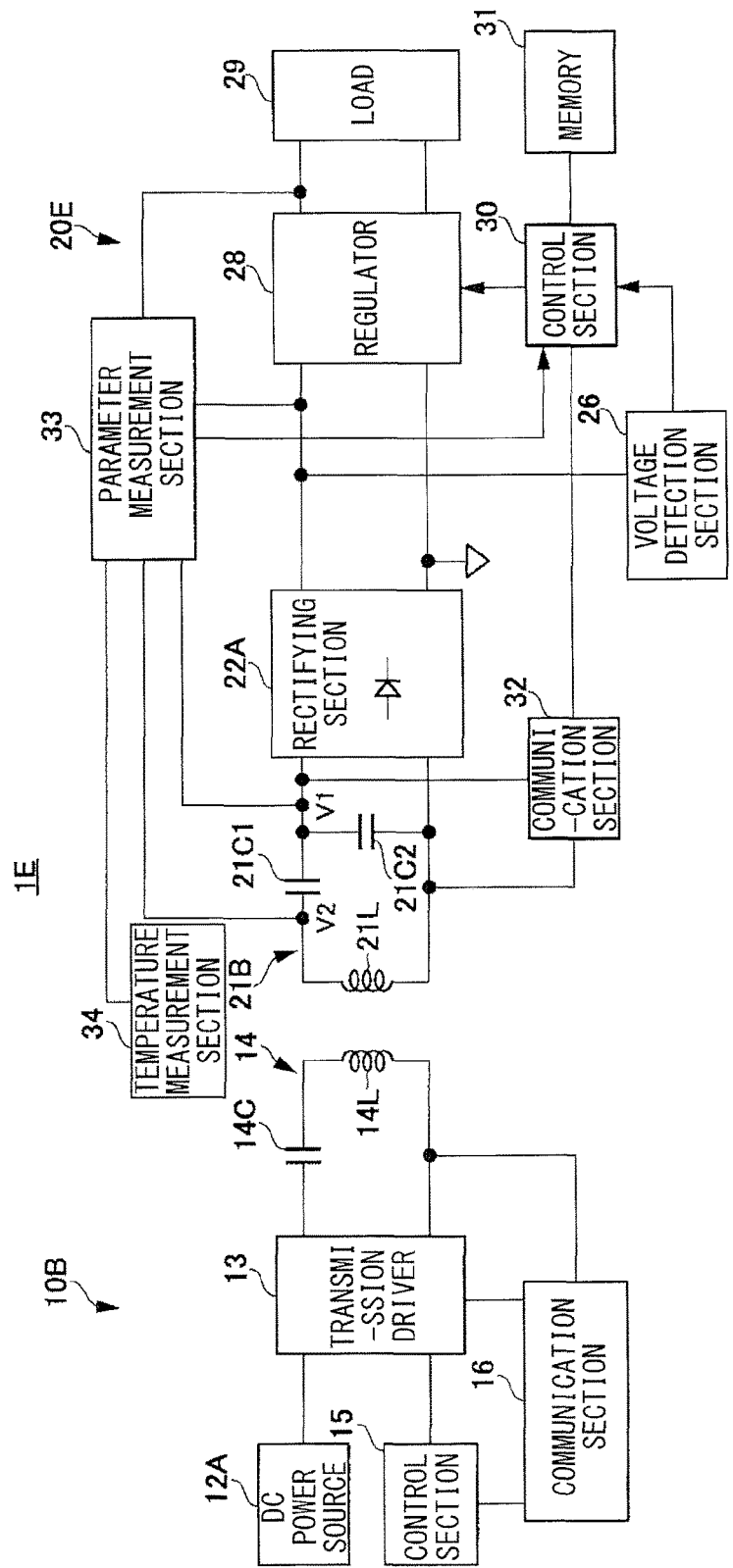

[ FIG. 10 ]
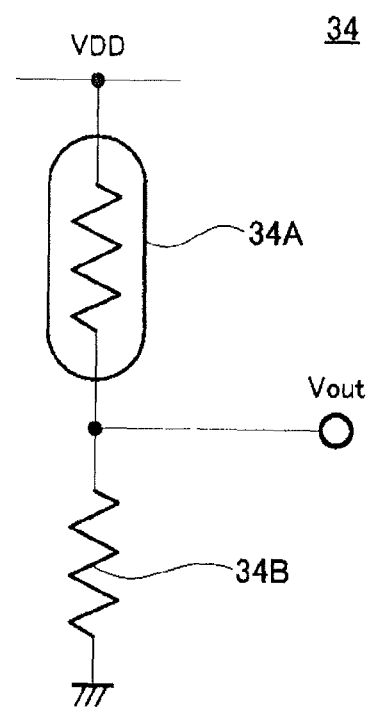

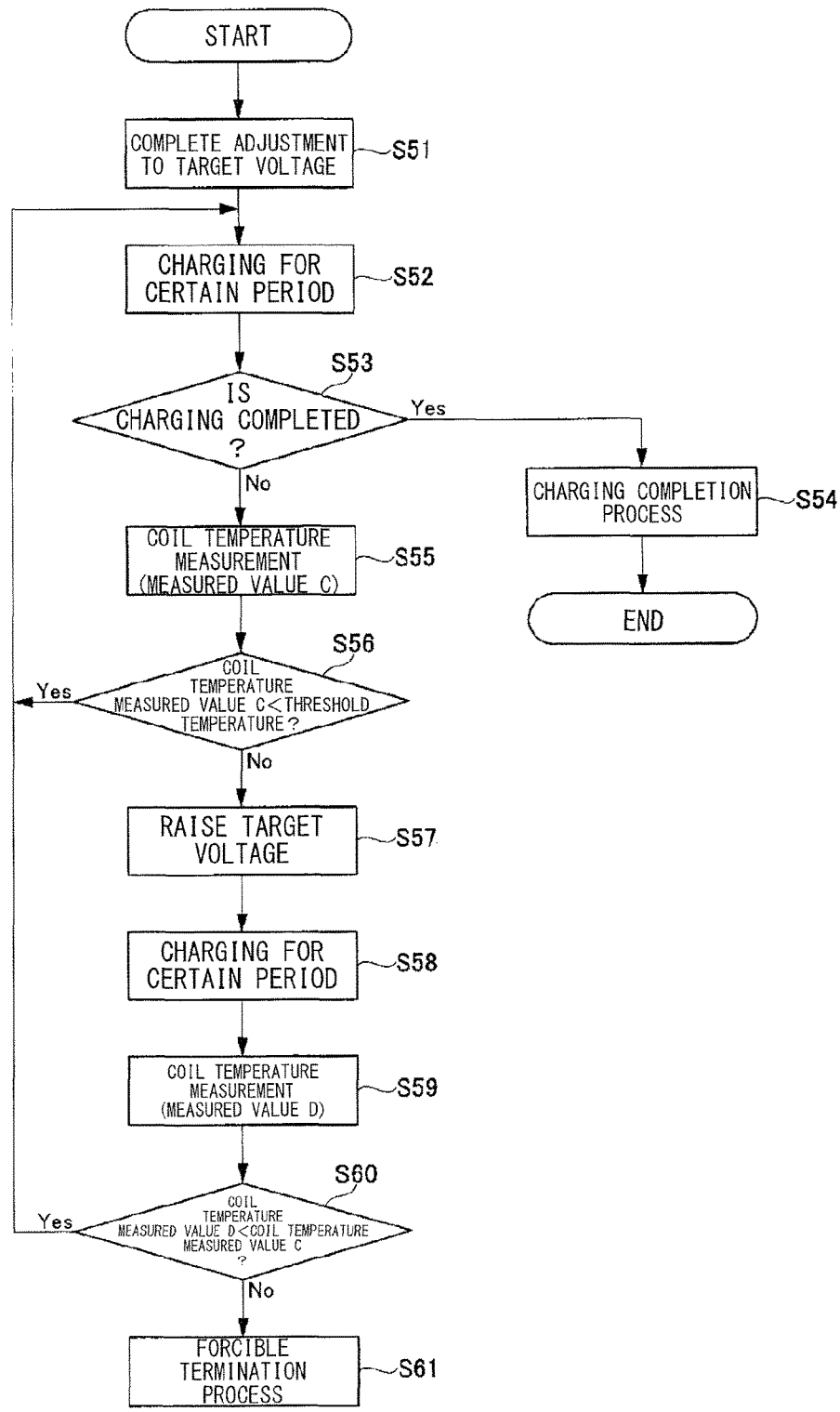
[FIG. 11]

POWER RECEIVER, NON-CONTACT POWER TRANSMISSION SYSTEM, AND METHOD OF CONTROLLING RECEIVED-POWER VOLTAGE

CROSS REFERENCE TO RELATED APPLICATIONS

This application claims the benefit of Japanese Priority Patent Application JP 2013-005556 filed Jan. 16, 2013, the entire contents of which are incorporated herein by reference.

TECHNICAL FIELD

The present disclosure relates to a power receiver, a non-contact power transmission system, and a method of controlling a received-power voltage that receive power from a power transmitter in a non-contact manner.

BACKGROUND ART

In recent years, non-contact power transmission systems (non-contact feeding systems) supplying power through a wireless line, namely, in a non-contact manner have been actively developed. Among them, an electromagnetic induction method is drastically commercialized and standardized. The electromagnetic induction method has extremely higher coupling degree between a power transmission side and a power reception side, and allows power feeding with high efficiency. Thus, the electromagnetic induction method is actively commercialized mainly in mobile devices. In addition, standardization of the electromagnetic induction method becomes active, and the standardization is progressed by an industry organization called wireless power consortium (WPC). By standardization, products from different companies are allowed to have compatibility, and thus charging in many combinations of power transmitters and power receivers becomes possible.

A current big issue of the electromagnetic method is an increase in power. Many of power receivers currently commercialized receive power at a level of 1 W, 2.5 W, 5 W, and the like, and an increase in received power to 10 W, 15 W, and the like, is expected.

However, typically, along with the increase in received power of the power receiver, the temperature of the power receiver is disadvantageously raised.

In a power receiver, as a power source integrated circuit (IC) supplying power to a load, for example, a regulator so-called low drop out (LDO) is used. In the LDO, a difference between an input voltage and an output voltage is small, and the output voltage is stabilized. In addition, a power source IC using a DC-DC converter with small power loss and high efficiency is also used. PTL 1 describes a configuration as an example of the power source IC using a DC-DC converter. The invention described in PTL 1 is a non-contact feeding system in which a target voltage is set according to a received power, and the non-contact feeding system performs control based on a magnitude of the received power and control using a target impedance.

CITATION LIST

Patent Literature

[PTL 1]
Japanese Patent No. 4868077 (International Publication No. WO 2010/035321)

SUMMARY

Technical Problem

Incidentally, heat generation of the secondary-side coil are varied depending on components used in the power receiver. In the invention described in PTL 1, however, influence of the heat generation of the secondary-side coil is not considered.

It is desirable to control a received-power voltage of a secondary-side unit in consideration of influence of heat generation of a secondary-side coil.

Solution to Problem

Some embodiments are directed to a device configured to receive power. The device comprises a coil having a resistance; and at least one circuit configured to: calculate a target voltage value based on an amount of power received by the device and the resistance of the coil, and control received power voltage based on the calculated target voltage value.

Some embodiments are directed to a method for use in connection with receiving power using a device comprising a coil, the coil having a resistance. The method comprises using at least one circuit to: calculate a target voltage value based on an amount of power received by the device and the resistance of the coil, and control received power voltage based on the calculated target voltage value.

Some embodiments are directed to a system comprising a first device configured to transmit power; and a second device configured to receive power from the first device, the second device comprising: a coil having a resistance; and at least one circuit configured to: calculate a target voltage value based on an amount of power received by the second device and the resistance of the coil, and control received power voltage based on the calculated target voltage value.

Advantageous Effects of Invention

According to the above-described embodiment of the disclosure, the target voltage value is determined from the resistance value of the secondary-side coil in the secondary-side power receiver and received power. Therefore, it is possible to control a received-power voltage in consideration of influence of heat generation of the secondary-side coil.

It is to be understood that both the foregoing general description and the following detailed description are exemplary, and are provided to provide further explanation of the technology as claimed.

BRIEF DESCRIPTION OF DRAWINGS

The accompanying drawings are included to provide a further understanding of the technology, and are incorporated in and constitute a part of this specification. The drawings illustrate embodiments and, together with the specification, serve to explain the principles of the technology.

FIG. 1 is a block diagram illustrating a circuit configuration example of a non-contact power transmission system using an LDO.

FIG. 2 is a block diagram illustrating a circuit configuration example of a non-contact power transmission system using a DC-DC converter.

FIG. 3 is a block diagram illustrating a circuit configuration example of a non-contact power transmission system according to a first embodiment of the disclosure.

FIG. 4 is a flowchart illustrating received-power voltage control by the non-contact power transmission system according to the first embodiment of the disclosure.

FIG. 5 is a flowchart illustrating an example of voltage adjustment processing that is a sub-routine of the receiving voltage control.

FIG. 6 is a flowchart illustrating received-power voltage control in the case where a target voltage value is determined so that inter-coil efficiency is a maximum, according to a second embodiment of the disclosure.

FIG. 7 is a block diagram illustrating a circuit configuration example of a non-contact power transmission system according to a third embodiment of the disclosure.

FIG. 8 is a block diagram illustrating an example of a Q-value measurement circuit as an example of a parameter measurement section in FIG. 7.

FIG. 9 is a block diagram illustrating a circuit configuration example of a non-contact power transmission system according to a fourth embodiment of the disclosure.

FIG. 10 is a circuit diagram illustrating an example of a temperature detection section.

FIG. 11 is a flowchart illustrating received-power voltage control according to the fourth embodiment of the disclosure.

DESCRIPTION OF EMBODIMENTS

Hereinafter, some embodiments for carrying out the disclosure (hereinafter, referred to as embodiments) will be described. In the specification and drawings, like numerals are used to designate components having a substantially same function or configuration, and overlapped description thereof will be omitted. Incidentally, the description will be given in the following order.
1. First Embodiment (a control section: an example of calculating a target voltage value from received power and a resistance value of a secondary-side coil)
2. Second Embodiment (a control section: an example of setting a target voltage value that maximizes inter-coil efficiency)
3. Third Embodiment (a parameter measurement section: an example of measuring parameters in real time)
4. Fourth Embodiment (a temperature detection section: an example of setting a target voltage value in a reflection of temperature of a secondary-side coil)

1. First Embodiment (Background of Disclosure)
FIG. 1 is a block diagram illustrating a circuit configuration example of a non-contact power transmission system using LDO that is a series regulator. A non-contact power transmission system 1 illustrated in FIG. 1 includes a power transmitter 10 (a primary-side unit) and a power receiver 20 (a secondary-side unit), and may transmit (feed) power from the power transmitter 10 to the power receiver 20 by an electromagnetic induction method in a non-contact manner.

The power transmitter 10 may include an AC power source 11, an AC-DC converter 12, a transmission driver 13, and a resonance circuit 14, for example. The AC-DC converter 12 converts an AC signal generated by the AC power source 11 into a DC signal, and supplies the DC signal to the transmission driver 13. The transmission driver 13 converts the DC signal received from the AC-DC converter 12 into an AC signal while performing voltage conversion, and supplies the AC signal to the resonance circuit 14.

The resonance circuit 14 is a series resonance circuit in which a primary-side coil (a power transmission coil) 14L and a resonance capacitor 14C are connected in series. The resonance circuit 14 resonates at a predetermined frequency $f(=1/\{2\,\mathrm{pi}\,(LC)^{1/2}\})$ that is determined from an inductance value of the primary-side coil 14L and a capacitance value of the resonance capacitor 14C (pi represents circular constant). The primary-side coil 14L of the resonance circuit 14 generates an AC magnetic field corresponding to the AC signal supplied from the transmission driver 13.

The configuration of the resonance circuit 14 is not limited to this example. As the resonance circuit, for example, it is only necessary to arrange a resonance capacitor to be connected to the primary-side coil 14L in series, in parallel, or in combination of series and parallel.

Moreover, FIG. 1 illustrates an example in which a full bridge inverter configured of switching elements 13S1 to 13S4 is applied to the transmission driver 13. As the switching elements 13S1 to 13S4, a field-effect transistor such as a metal-oxide-semiconductor field-effect transistor (MOSFET) for power may be used. The MOSFET for power is also called power MOSFET.

The power receiver 20 may include a resonance circuit 21, a rectifying smoothing circuit 22, an LDO 23, a charge control circuit 24, and a battery 25 as a feeding target, for example. In the power receiver 20, a secondary-side coil 21L receives the AC magnetic field generated in the power transmitter 10 by the electromagnetic induction method, and an AC signal is extracted through the resonance circuit 21 including the secondary-side coil 21L. The extracted AC signal is rectified and smoothed by the rectifying smoothing circuit 22. The LDO 23 uses the rectified and smoothed signal to generate a constant voltage, and supplies the constant voltage to the charge control circuit 24. Then, the charge control circuit 24 controls charging of the battery 25 that is a feeding target.

In the example of FIG. 1, the resonance circuit 21 is a series resonance circuit in which the secondary-side coil (a power reception coil) 21L and a resonance capacitor 21C are connected in series. Similarly to the power transmitter 10, the configuration of the resonance circuit 14 is not limited to this example. The rectifying smoothing circuit 22 may include a bridge rectifying circuit that is configured of diodes 22d1 to 22d4, and a smoothing capacitor 22C that is connected in parallel to the bridge rectifying circuit, for example, but the configuration of the rectifying smoothing circuit 22 is not limited to this example.

The power receiver 20 further includes a voltage detection section 26 detecting a voltage (a secondary-side voltage) of a signal that is rectified by the bridge rectifying circuit of the rectifying smoothing circuit 22. Although the voltage is typically detected using the rectified signal, a signal before rectification may be used.

Information of the voltage value detected by the voltage detection section 26 is transmitted to the power transmitter 10 by a communication section (not illustrated). The power transmitter 10 controls the AC-DC converter 12 based on the rectified voltage value (also referred to as "rectified voltage") received from the power receiver 20, and adjusts the transmitted power so that the rectified voltage becomes a predetermined voltage (for example, 5 V).

As described above, in the non-contact power transmission system 1 including the LDO 23 in the power receiver 20, the information of the rectified voltage is informed from the power receiver 20 to the power transmitter 10. Then, the power transmitter 10 performs control so that the rectified voltage of the power receiver 20 is constant as well as a difference between a voltage input to the LDO 23 and a voltage (a load voltage) output from the LDO 23 to the charge control circuit 24 is small.

The LDO 23 outputs a constant voltage irrespective of the received power of the power receiver 20, and thus a larger current flows through the circuit in the power receiver 20 as the received power is increased. Examples of temperature of heat generated by the secondary-side coil 21 depending on the received power are illustrated in Table 1.

TABLE 1

| Item<br>Unit | Secondary-side<br>load power<br>W | Secondary-side<br>voltage<br>V | Secondary-side<br>current value<br>A | Secondary-side<br>coil resistance value<br>Ω | Secondary-side<br>loss power<br>W | Secondary-side<br>coil generated-heat<br>temperature<br>° C. |
|---|---|---|---|---|---|---|
| 5 W power reception system | 5 | 5 | 1 | 0.4 | 0.4 | 13.33333333 |
| 10 W power reception system | 10 | 5 | 2 | 0.4 | 1.6 | 53.33333333 |
| 15 W power reception system | 15 | 5 | 3 | 0.4 | 3.6 | 120 |

Since the LDO 23 is used in the circuit of the power receiver 20, the current value (A) is determined uniquely from an expression (1) according to the power when the rectified voltage of the power receiver 20 is 5 V, for example. In addition, the resistance value (Ω) of the secondary-side coil 21L is fixed irrespective of the power.

[Math. 1]

$$I = \frac{W}{V} \quad (1)$$

[Math. 2]

$$P = I^2 R \quad (2)$$

A model value of the resistance value of the secondary-side coil 21L in Table 1 was set to 0.4Ω from measurement. The loss power P of the secondary-side coil 21L is determined by a product of the square of the current and the resistance value from Joule's law (expression (2)). The conversion equation between the loss power (W) and the temperature (deg C.) of the secondary-side coil 21L was set to 20 (deg C.)/0.6 (W) from the measurement result because it also depends on a heat radiation area and the like. It is found from the results in Table 1 that when the received power (the load power) on the secondary side is 5 W, the temperature increase of the secondary-side coil 21L is relatively small, which is about 13 deg C. However, the temperature increase of about 53 deg C. in the case of the received power of 10 W and about 120 deg C. in the case of the received power of 15 W are supposed, which is disadvantageous in terms of safety.

FIG. 2 is a block diagram illustrating a circuit configuration example of a non-contact power transmission system using a DC-DC converter that is a switching regulator. A non-contact power transmission system 1A in FIG. 2 includes the power transmitter 10 and a power receiver 20A that uses a DC-DC converter 27 in place of the LDO 23 of the power receiver 20 in FIG. 1.

In the power receiver 20A, the secondary-side coil 21L receives the AC magnetic field generated by the power transmitter 10 by the electromagnetic induction method, and the AC signal is extracted through the resonance circuit 21 including the secondary-side coil 21L. The extracted AC signal is rectified and smoothed by the rectifying smoothing circuit 22. The DC-DC converter 27 performs the switching operation in the inside thereof to turn on or off the input signal, thereby performing the voltage conversion. Then, the DC-DC converter 27 supplies the converted voltage to the charge control circuit 24. The voltage subjected to the voltage conversion is, for example, 5 V. Then, charging of the battery 25 that is a feeding target is controlled by the charge control circuit 24.

The information of the voltage value detected by the voltage detection section 26 is transmitted to the power transmitter 10 by a communication section (not illustrated). The power transmitter 10 controls the AC-DC converter 12 based on the information of the rectified voltage received from the power receiver 20, and adjusts transmitted power so that the rectified voltage becomes a predetermined voltage.

Table 2 illustrates setting examples of a target voltage value according to the received power. Items in Table 2 are the same as those in Table 1. In Table 2, three types of coils A to C are assumed as the secondary-side coil 21L.

TABLE 2

| Item<br>Unit | Secondary-side<br>load power<br>W | Secondary-side<br>voltage<br>V | Secondary-side<br>current value<br>A | Secondary-side<br>coil resistance value<br>Ω | Secondary-side<br>loss power<br>W | Secondary-side<br>coil generated-heat<br>temperature<br>° C. |
|---|---|---|---|---|---|---|
| Coil A | 15 | 10 | 1.5 | 0.2 | 0.45 | 15.0 |
| Coil B | 15 | 10 | 1.5 | 0.6 | 1.35 | 45.0 |
| Coil C | 15 | 10 | 1.5 | 1 | 2.25 | 75.0 |

The resistance value of the secondary-side coil largely depends on its size. For example, the secondary-side coil reduced in thickness has a small width of a winding wire, and thus the resistance value of the secondary-side coil is increased. In particular, in the field of non-contact power transmission, downsizing of the power receiver (such as a mobile device) is largely desired. For example, in Table 2, when the target voltage is set to 10 V in the case of the received power of 15 W, the temperature increase of the coil A is suppressed to about 15 deg C. by the above-described calculation method. However, the temperature increase of the coil C is about 75 deg C. In other words, it is conceivable that an optimum voltage value is varied depending on the resistance value of the secondary-side coil in terms of heat generation of the coil.

Therefore, it is desirable to set a secondary-side target voltage based on the resistance value of the secondary-side coil and the received power in order to solve the above-described disadvantage.

(Circuit Configuration Example of Non-Contact Power Transmission System)

FIG. 3 is a block diagram illustrating a circuit configuration example of a non-contact power transmission system according to a first embodiment of the disclosure. A non-contact power transmission system 1B illustrated in FIG. 3 includes a power transmitter 10B and a power receiver 20B. In the non-contact power transmission system 1B in FIG. 3, components corresponding to those in FIG. 1 and FIG. 2 are designated by the same reference numerals as those in FIG. 1 and FIG. 2.

(Power Transmitter)

The power transmitter 10B may include a DC power source 12A outputting a DC signal, the transmission driver 13, the resonance circuit 14, a control section 15, and a communication section 16, for example.

For example, the DC power source 12A may include the AC power source 11 and the AC-DC converter 12. The control section 15 supplies a drive signal to the transmission driver 13 based on an input signal (a control signal) to control drive of the transmission driver 13. For example, an arithmetic processing unit such as a microcomputer and a central processing unit (CPU) may be applied to the control section 15. For example, the input signal may be generated automatically based on predetermined setting values, execution program, and the like, or may be generated based on user operation.

The communication section 16 performs transmission and reception of data with a communication section 32 of the power receiver 20B by a load modulation method.

When data is transmitted from the power transmitter 10B, the AC signal generated by the power transmitter 10B is directly varied in amplitude. More specifically, according to a transmission data sequence (a base band signal), the control section 15 varies the value of a load resistance component in the communication section 16, and performs amplitude modulation of the AC signal output from the transmission driver 13. Moreover, when the power transmitter 10B receives data from the power receiver 20B, a demodulation circuit in the communication section 16 demodulates the AC signal that is modulated in amplitude and is received by the primary-side coil 14L, to extract a reception data sequence (the base band signal). Then, the reception data sequence is analyzed by the control section 15.

(Power Receiver)

The power receiver 20B may include a resonance circuit 21B, a rectifying section 22A, the voltage detection section 26, a regulator 28, a load 29, a control section 30, a memory 31, and the communication section 32, for example.

In the resonance circuit 21B, a resonance capacitor 21C1 and a resonance capacitor 21C2 that are connected in series are connected to both ends of the secondary-side coil 21L.

Terminals on the input side of the rectifying section 22A are connected to the both ends of the resonance capacitor 21C2, and the inside of the rectifying section 22A is configured of a bridge rectifying circuit of the rectifying smoothing circuit 22. The rectifying section 22A rectifies the input AC signal to supply the rectified AC signal to the regulator 28.

The regulator 28 is a voltage stabilizing section generating a stabilized constant voltage, and may be configured using a regulator such as an LDO and a DC-DC converter. The regulator 28 supplies the generated constant voltage to the load 29 such as a battery.

The control section 30 controls the regulator 28 based on the detection result by the voltage detection section 26. Moreover, the control section 30 controls the communication section 32 to perform transmission and reception of data between the power transmitter 10B and the power receiver 20B. For example, an arithmetic processing unit such as a microcomputer and a CPU may be applied to the control section 30. For example, the input signal may be generated automatically based on predetermined setting values, execution program, and the like, or may be generated based on user operation. Note that data such as determined values and execution program may be stored in the memory 31. A rewritable non-volatile semiconductor memory such as a flash memory may be applied to the memory 31.

In the first embodiment, the control section 30 is configured of a target voltage value calculation section 30a, a determination section 30b, and a voltage adjustment section 30c. The target voltage value calculation section 30a calculates a target value of a voltage (a target voltage value) to be supplied from the rectifying section 22A to the regulator 28 based on the resistance value of the secondary-side coil 21L and the received power, when the power receiver 20B receives power from the primary-side coil 14L in a non-contact manner.

The determination section 30b determines whether the target voltage value calculated by the target voltage value calculation section 30a is larger than a preset threshold.

The voltage adjustment section 30c adjusts the value of the secondary-side voltage detected by the voltage detection section 26 to be the target voltage value, based on the target voltage value calculated by the target voltage value calculation section 30a.

The communication section 32 has a function equivalent to that of the communication section 16 of the power transmitter 10B. In other words, the communication section 32 performs transmission and reception of data with the communication section 16 of the power transmitter 10B by the load modulation method.

When data is transmitted from the power receiver 20B, the control section 30 varies the value of the load resistance component in the communication section 32 that is connected in parallel to the resonance capacitor 21C2, according to the transmission data sequence (the base band signal). As a result, the AC signal output from the power transmitter 10B is modulated in amplitude, and the transmission data sequence from the power receiver 20B is observed by the power transmitter 10B. In addition, when the power receiver 20B receives data from the power transmitter 10B, the communication section 32 demodulates the AC signal that is modulated in amplitude and is received by the secondary-side coil 21L, to extract the reception data sequence (the base band signal). Then, the reception data sequence is analyzed by the control section 30.

The regulator 28, the voltage detection section 26, the control section 30, the communication section 32, and the like of the power receiver 20B may be configured of an integrated circuit (IC), for example.

(Received-Power Voltage Control)

Next, the received-power voltage control in the non-contact power transmission system 1B is described. For example, as for the secondary-side coil used for the measurement in Table 1, it is assumed that the temperature increase of the secondary-side coil is suppressed to 20 deg C. or less irrespective of variation of the received power. When it is assumed that the temperature increase of the secondary-side coil is suppressed to 20 deg C. or less, the secondary-side voltage value intended to be a target, namely, a target voltage value is uniquely determined from two parameters, the resistance value of the secondary-side coil and the received power because the power loss on the secondary side is tolerable up to 0.6 W. Table 3 illustrates setting examples of a target voltage value according to the resistance value of the secondary-side coil and the received power. Items in Table 3 are the same as those in Table 1 and Table 2.

Table 4 illustrates setting examples of a target voltage value of the three kinds of secondary-side coils illustrated in Table 2. As with Table 3, it is assumed that the temperature increase of the secondary-side coil is suppressed to 20 deg C. or less (an amount of coil loss is 0.6 W or less). It is found from Table 4 that even if the received power is fixed to 15 W, it is necessary for the secondary-side circuit to be driven at a higher voltage as the secondary-side coil resistance value is larger.

TABLE 4

| Item<br>Unit | Secondary-side<br>load power<br>W | Secondary-side<br>voltage<br>V | Secondary-side<br>current value<br>A | Secondary-side<br>coil resistance value<br>Ω | Secondary-side<br>loss power<br>W | Secondary-side<br>coil generated-heat<br>temperature<br>° C. |
|---|---|---|---|---|---|---|
| Coil A | 15 | 8.660254 | 1.73 | 0.2 | 0.6 | 20.0 |
| Coil B | 15 | 15 | 1.00 | 0.6 | 0.6 | 20.0 |
| Coil C | 15 | 19.36492 | 0.77 | 1 | 0.6 | 20.0 |

FIG. 4 is a flowchart illustrating the received-power voltage control in the non-contact power transmission system 1B, in a reflection of the above-described consideration. First, when the power transmitter 10B and the power receiver 20B are magnetically coupled, the power transmission of the power transmitter 10B is operated (step S1), and power is supplied to the integrated circuit (IC) of the power receiver 20B to initiate the IC (step S2). The transmitted power of the power transmitter 10B at this time may be a preset minimum power, for example.

Upon initiation of the IC in the power receiver 20B, for example, communication from the power receiver 20B to the power transmitter 10B is performed. The communication

TABLE 3

| Item<br>Unit | Secondary-side<br>load power<br>W | Secondary-side<br>voltage<br>V | Secondary-side<br>current value<br>A | Secondary-side<br>coil resistance value<br>Ω | Secondary-side<br>loss power<br>W | Secondary-side<br>coil generated-heat<br>temperature<br>° C. |
|---|---|---|---|---|---|---|
| 5 W power reception system | 5 | 4.082483 | 1.22 | 0.4 | 0.6 | 20.0 |
| 10 W power reception system | 10 | 8.164966 | 1.22 | 0.4 | 0.6 | 20.0 |
| 15 W power reception system | 15 | 12.24745 | 1.22 | 0.4 | 0.6 | 20.0 |

As it is understood from Table 3, since the current value allowed to flow through the secondary side is determined by the tolerable secondary-side loss power and the secondary-side coil resistance value, the target voltage value is determined from the secondary-side current value and the received power. For example, in the example of Table 3, when the received power is 5 W, the target voltage value is determined to about 4.08 V from 5 (W)/1.22 (A).

A target voltage value in the case where three kinds of secondary-side coils are assumed as represented in Table 2 is now described. Various applications are supposed in non-contact power transmission. For example, a tolerable area and a tolerable thickness of the secondary-side coil are different between tablet-type terminals and multifunctional mobile phone terminals that are so-called smart phones. Therefore, various values are supposed for the secondary-side coil resistance value.

section 32 transmits information of a voltage necessary for the IC in the power receiver 20B to the power transmitter 10B, for example, in response to control by the control section 30 of the power receiver 20B. The communication section 16 of the power transmitter 10B receives the information of the voltage transmitted from the power receiver 20B. The control section 15 of the power transmitter 10B determines power to be transmitted to the power receiver 20B, based on the received information of the voltage necessary for the power receiver 20B and the transmission capability of the power transmitter 10B. In other words, the received power of the power receiver 20B is determined (step S3).

Next, the target voltage value calculation section 30a of the control section 30 of the power receiver 20B acquires a resistance value of the secondary-side coil 21L. For example, the target voltage value calculation section 30a may retrieve the information stored in advance in the memory 31 from the memory 31 as the resistance value of the secondary-side coil 21L (step S4). Alternatively, the resistance value measured in real time may be acquired as the resistance value of the secondary-side coil 21L.

The target voltage value calculation section 30a of the control section 30 calculates the above-described target voltage value from the resistance value of the secondary-side coil 21L and the received power (step S5).

At this time, the determination section 30b of the control section 30 determines whether the calculated target voltage value is larger than a threshold A that may be determined from a withstand voltage of the IC, for example (step S6). When the target voltage value is larger than the threshold A, the resistance value of the secondary-side coil 21L or the received power may be excessively large (overvoltage). Therefore, the determination section 30b of the control section 30 performs a process to forcibly terminate the received-power voltage control (step S7). Then, the power receiver 20B performs power reception at minimum received power.

On the other hand, when it is determined that the target voltage value is equal to or smaller than the threshold A in the determination process at step S6, the voltage adjustment section 30c of the control section 30 adjusts the secondary-side voltage of the power receiver 20B to the target voltage (step S8).

Then, the voltage adjustment section 30c of the control section 30 determines whether the secondary-side voltage detected by the voltage detection section 26 is equal to the target voltage (step S9). When the secondary-side voltage is not equal to the target voltage, the voltage adjustment section 30c of the control section 30 performs a process to forcibly terminate the received-power voltage control (step S10), and the power receiver 20B performs power reception at the received power at that time or at the minimum received power.

On the other hand, when it is determined that the secondary-side voltage is equal to the target voltage in the determination process at step S9, the control section 30 terminates the received-power voltage control, and the power receiver 20B performs power reception at the received power of the target voltage value.

(Voltage Adjustment Processing)

A plurality of methods is conceivable for of adjusting the secondary-side voltage to the target voltage in the voltage adjustment processing at step S8. FIG. 5 is a flowchart illustrating an example of the voltage adjustment processing that is a sub-routine of the received-power voltage control.

When the voltage adjustment processing is started, the voltage adjustment section 30c of the control section 30 determines whether the secondary-side voltage value is equal to the target voltage value. When it is determined that the secondary-side voltage value is equal to the target voltage value, the voltage adjustment section 30c terminates the voltage adjustment processing, and then processing proceeds to the determination process at step S9 in FIG. 4 (step S21).

On the other hand, when it is determined that the secondary-side voltage value is not equal to the target voltage value in the determination process at step S21, the voltage adjustment section 30c determines whether the secondary-side voltage value is smaller than the target voltage value (step S22).

When it is determined that the secondary-side voltage value is smaller than the target voltage value, the processing proceeds to a process at step S23. Then, the voltage adjustment section 30c controls the communication section 32 to request the power transmitter 10B to increase the transmitted power through communication (step S23). Alternatively, when it is determined that the secondary-side voltage value is larger than the target voltage value, the processing proceeds to a process at step S24. Then, the voltage adjustment section 30c controls the communication section 32 to request the power transmitter 10B to decrease the transmitted power through communication (step S24).

After the end of the process at step S23 or S24, the voltage adjustment section 30c determines whether the secondary-side voltage value is varied (step S25). When it is determined that the secondary-side voltage value is varied, the processing proceeds to the process at step S21. The above-described processes are repeated until the secondary-side voltage value becomes the target voltage value.

On the other hand, when it is determined that the secondary-side voltage value is not varied in the determination process at step S25, the voltage adjustment section 30c terminates the voltage adjustment processing, and the processing proceeds to the process at step S9 (FIG. 4). Alternatively, when the secondary-side voltage is not varied for a certain period nevertheless increasing or decreasing the transmitted power is requested to the power transmitter 10B, the voltage adjustment processing may be terminated. As described above, when the secondary-side voltage is not varied nevertheless increasing or decreasing the transmitted power is requested to the power transmitter 10B, the voltage adjustment processing is terminated because the request may exceed the range of the capability for adjusting the transmitted power of the power transmitter 10B.

Incidentally, the increasing or decreasing of the transmitted power by the power transmitter 10B may be achieved by varying the power source voltage of the DC power source 12A, or may be achieved by varying a frequency of the AC signal output from the transmission driver 13 and using frequency characteristics of the primary-side coil 14L. Alternatively, the increasing or decreasing of the transmitted power may be achieved by adjusting a duty ratio of the pulse sequence that is included in a high frequency signal and is output as the AC signal from the transmission driver 13.

As described above, in the first embodiment, the target voltage value of the secondary-side voltage is appropriately set based on the resistance value of the secondary-side coil 21L and the received power. This allows suppression of the temperature increase of a thin coil or a small coil that is a disadvantage peculiar to non-contact power transmission. In addition, even in the case where the received power is increased or even in the case where the power is transmitted to a coil having a large resistance value because of diversity of the secondary-side coil 21L, the power receiver appropriately controls the secondary-side voltage, and suppresses the temperature increase within a certain level.

2. Second Embodiment

The target voltage value in the power receiver 20B (FIG. 3) may be set so that the power transmission efficiency (inter-coil efficiency) between the primary-side coil and the secondary-side coil that are magnetically coupled is a maximum. Hereinafter, as a second embodiment, received-power voltage control in the case where the target voltage value is determined so that the inter-coil efficiency (hereinafter, referred to as "efficiency") is a maximum.

The total loss generated on the primary-side coil 14L and the secondary-side coil 21L is determined from a load resistance value in anticipation of a load from the secondary-side coil 21L to the power receiver 20B. To maximize the efficiency and to minimize the total heat generated by the primary-side coil 14L and the secondary-side coil 21L, the load may be adjusted to a load resistance value $R_{Lopt}$ (so-called optimum load resistance value) having a minimum loss. When a resonance frequency of the resonance circuit 21B is the same as the transmission frequency of the power transmitter 10B, the load resistance value $R_{Lopt}$ having the minimum loss is represented by the expression (4), using a resistance value $R_2$ of the secondary-side coil 21L, a coupling coefficient k between the primary-side coil 14L and the secondary-side coil 21L, a geometric mean Q between a Q-value of the primary-side coil 14L ($Q_1$) and a Q-value of the secondary-side coil 21L ($Q_2$), that is represented by the expression (3).

[Math. 3]

$$Q = \sqrt{Q_1 Q_2} \quad (3)$$

[Math. 4]

$$R_{Lopt} = R_2 \sqrt{1 + (kQ)^2} \quad (4)$$

[Math. 5]

$$R_L = \frac{V^2}{W} \quad (5)$$

A load resistance value $R_L$ is uniquely determined from the received power and the target voltage value as represented by the expression (5), and the load resistance value $R_L$ is adjusted by adjusting the received power and/or the target voltage value. In other words, the load resistance value having a minimum loss is determined using the Q-value between the primary-side coil 14L and the secondary-side coil 21L and the coupling coefficient k as well as the resistance value $R_2$ of the secondary-side coil and the received power. Then, the target voltage value is determined using the load resistance value having a minimum loss to adjust the secondary-side voltage to the voltage value exhibiting maximum efficiency.

FIG. 6 is a flowchart illustrating the received-power voltage control in the case where the target voltage value is determined so that the inter-coil efficiency is a maximum, according to the second embodiment of the disclosure. First, the received power of the power receiver 20C is determined in the non-contact power transmission system 1B (step S31 to S33) in the same way as the processes at steps S1 to S3 in FIG. 4.

Next, the target voltage value calculation section 30a of the control section 30 of the power receiver 20B acquires parameters necessary for determining the secondary-side voltage value exhibiting maximum efficiency (step S34). The necessary parameters are different depending on calculation methods of the secondary-side voltage value. For example, the coupling coefficient k and the Q-value between the primary-side coil 14L and the secondary-side coil 21L may be necessary in addition to the resistance value $R_2$ of the secondary-side coil when the above-described expression (3) is used. As the parameters, for example, information previously stored in the memory 31 may be retrieved by the target voltage value calculation section 30a from the memory 31, or values measured in real time may be acquired. Alternatively, the parameters may be transmitted from the power transmitter 10B to the power receiver 20C through communication.

The target voltage value calculation section 30a calculates the target voltage value after acquiring the parameters (step S35). The total efficiency of the target voltage value is the maximum, and therefore the temperature increase may be large depending on the secondary-side coil 21L. Since the secondary-side current value is determined from the target voltage value and the received power, the loss value of the secondary-side coil 21L (hereinafter, also referred to as "coil loss value") is allowed to be calculated from the resistance value of the secondary-side coil 21L and the secondary-side current value with use of the expression (2). When the coil loss value is equal to or less than an arbitrary threshold B, power feeding is performed at the secondary-side voltage value exhibiting maximum efficiency. When the coil loss value is larger than the threshold B, the efficiency is the maximum, however the temperature increase of the secondary-side coil 21L is large. Therefore, it is necessary to recalculate the target voltage value.

Therefore, the determination section 30b of the control section 30 determines whether the calculated coil loss value is larger than the threshold B (step S36). When it is determined that the coil loss value is larger than the threshold B, the target voltage value is recalculated (step S37), and the processing proceeds to a process at step S38. As a method of recalculating the target voltage value, for example, the target value may be set to a voltage value allowing efficiency to be the closest to a maximum and allowing the calculated coil loss value not to exceed the threshold.

On the other hand, when it is determined that the coil loss value is equal to or less than the threshold B in the determination process at step S36, the voltage adjustment section 30c of the control section 30 adjusts the secondary-side voltage of the power receiver 20B to the target voltage (step S38). Likewise, the voltage adjustment process at step S38 is performed after the process at step S37 is ended. The voltage adjustment process at step S38 is the same as the process at step S8.

Then, the voltage adjustment section 30c of the control section 30 determines whether the secondary-side voltage detected by the voltage detection section 26 is equal to the target voltage (step S39). When it is determined that the secondary-side voltage is not equal to the target voltage, the voltage adjustment section 30c of the control section 30 performs a process to forcibly terminate the received-power voltage control (step S40), and the power receiver 20B performs power reception at the received power at that time or at the minimum received power.

On the other hand, when it is determined that the secondary-side voltage is equal to the target voltage in the determination process at step S39, the control section 30 terminates the received-power voltage control, and the power receiver 20B performs power reception at the received power of the target voltage value.

As described above, in the second embodiment, the secondary-side voltage value is controlled to the voltage value exhibiting the maximum efficiency using the secondary-side coil resistance value, the received power, and the parameters. Therefore, it is possible to enhance efficiency of the entire non-contact power transmission system. In addition, the target voltage value may be set to a voltage value that allows efficiency to be closest to a maximum and allows the calculated coil loss value not to exceed the threshold, which makes it possible to control the voltage value to a voltage value capable of suppressing the temperature increase of the secondary-side coil and exhibiting optimum efficiency.

3. Third Embodiment

FIG. 7 is a block diagram illustrating a circuit configuration example of a non-contact power transmission system according to a third embodiment of the disclosure. A non-contact power transmission system 1C illustrated in FIG. 7 includes the power transmitter 10B, and a power receiver 20C that is configured by further providing a parameter measurement section 33 to the power receiver 20B illustrated in FIG. 3. The parameter measurement section 33 includes a circuit for measuring necessary parameters.

The parameter measurement section 33 measures the output current of the rectifying section 22A and the output voltage of the regulator 28. For example, the parameter measurement section 33 may measure the resistance value of the secondary-side coil 21L in real time. Moreover, the parameter measurement section 33 may measure a potential of a first terminal side (V1) and a potential of a second terminal side (V2) of the resonance capacitor 21C1 to measure a Q-value of the resonance circuit 21B. Further, the parameter measurement section 33 may measure the coupling coefficient k. The coupling coefficient k is determined from a distance between the primary-side coil 14L and the secondary-side coil 21L, and a relative size of the primary-side coil 14L and the secondary-side coil 21L. In addition, the shape of each coil and an angle between the coils also influence the coupling coefficient. A method of measuring the coupling coefficient may be defined by JIS C5321 (Japanese Industrial Standards) as an example.

When performing the received-power voltage control, the power receiver 20C uses the parameters measured by the parameter measurement section 33 in real time to determine the target voltage value. The other configurations are the same as those in the power receiver 20B.

In the third embodiment, the target voltage value is determined using the parameters measured by the parameter measuring section 33 in real time. Therefore, unlike the first and second embodiments, it is unnecessary to measure the parameters and to store the parameters in the memory 31 before the received-power voltage control is performed.

(Q-Value Measurement Circuit)

When it is desirable to measure the Q-value of the secondary-side coil 21L using the parameter measurement section 33, for example, a Q-value measurement circuit described in Japanese Patent No. 5071575 (Japanese Patent Application No. 2011-149465) as illustrated in FIG. 8 may be used. FIG. 8 is a block diagram illustrating an example of the Q-value measurement circuit as an example of the parameter measurement section 33. A power receiver 20D illustrated in FIG. 8 has a configuration in which a circuit in non-contact power transmission (in power feeding) and a circuit in Q-value measurement (a Q-value measurement circuit 33A) are switched over through switching.

The power receiver 20D includes a resonance circuit 21D, the rectifying section 22A, and a regulator 41, and supplies power to the load 29. The resonance circuit 21D is configured of the secondary-side coil 21L and the resonance capacitors 21C1 and 21C2.

In the resonance circuit 21D, the secondary-side coil 21L and the resonance capacitor 21C2 are connected in parallel, and a connection mid-point between the secondary-side coil 21L and the resonance capacitor 21C2 is connected to a first end of the resonance capacitor 21C1. A second end of the resonance capacitor 21C1 is connected to a first input terminal of the rectifying section 22A, and respective second ends of the secondary-side coil 21L and the resonance capacitor 21C2 that are connected in parallel are connected to a second input terminal of the rectifying section 22A. In addition, a capacitor 43 and a first switch 44 are connected in series, a first end of the capacitor 43 is connected to a first output terminal of the rectifying section 22A, and a first end of the first switch 44 is connected to a second output terminal of the rectifying section 22A. The first output terminal of the rectifying section 22A is connected to an input terminal of the first regulator 41 through a second switch 45, an output terminal of the first regulator 41 is connected to the load 29, and the second output terminal of the rectifying section 22A is connected to a ground terminal. The first output terminal of the rectifying section 22A is also connected to a second regulator 42.

The first regulator 41 controls the output voltage and the output current at constant, and may supply a voltage of about 5 V to the load 29, for example. Likewise, the second regulator 42 maintains the voltage and the current at constant, and may supply a voltage of about 3 V to blocks and switches, for example.

Further, the second end of the resonance capacitor 21C1 is connected to an AC power source 70 (an oscillation circuit) through a third switch 54A, a resistor 72, and an amplifier 71. In addition, the second end of the resonance capacitor 21C1 is connected to an input terminal of an amplifier 55A through a third switch 54B. On the other hand, the first end of the resonance capacitor 21C1 is connected to an input terminal of an amplifier 55B through a third switch 54C. Moreover, the respective second ends of the secondary-side coil 21L and the resonance capacitor 21C2 that are connected in parallel are connected to a ground terminal through a third switch 54D.

A switching element such as a transistor and an MOSFET may be applied to the first switch 44 (an example of a first switch section), the second switch 45 (an example of a second switch section), and the third switches 54A to 54D (examples of a third switch section). In this example, an MOSFET is used.

The parameter measurement section 33 in this example includes the amplifiers 55A and 55B, and as post stages of the amplifiers 55A and 55B, envelope detection sections 56A and 56B, analog-to-digital converters (hereinafter, referred to as "ADCs") 57A and 57B, and an arithmetic processing section 58.

An output terminal of the amplifier 55A is connected to the envelope detection section 56A. The envelop detection section 56A detects an envelope of an AC signal (corresponding to the voltage V1) that is input from the second end of the resonance capacitor 21C1 through the third switch 54B and the amplifier 55A, and supplies the detected signal to the ADC 57A.

On the other hand, an output terminal of the amplifier 55B is connected to the envelope detection section 56B. The envelope detection section 56B detects an envelop of an AC signal (corresponding to the voltage V2) that is input from the first end of the resonance capacitor 21C1 through the third switch 54C and the amplifier 55B, and supplies the detected signal to the ADC 57B.

The ADCs 57A and 57B convert the analog detected signals that are respectively input from the envelope detection sections 56A and 56B, into digital detected signals, and output the digital detected signals to the arithmetic processing section 58.

The arithmetic processing section 58 acquires a ratio of the voltage V1 and the voltage V2 (expression (6)) from the detected signals input from the ADCs 57A and 57B to calculate a Q-value.

[Math. 6]

$$Q = \frac{V2}{V1} \qquad (6)$$

The control section 30 uses power supplied from the second regulator 42 to supply a drive signal to each switch (for example, a gate terminal of the MOSFET), thereby controlling each switch to be turned on or off. Moreover, the control section 30 uses the Q-value measured by the Q-value measurement circuit 33A and the like to calculate the target voltage value.

The AC power source 70 generates an AC voltage (sine wave) at the time of Q-value measurement, based on the control signal from the control section 30, and supplies the generated AC voltage to the second end of the resonance capacitor 21C1 through the amplifier 71 and the resistor 72.

The parameter measurement section 33 of the power receiver 20D having the above-described configuration is controlled through ON-OFF switching of the three switch groups, namely, the first switch 44, the second switch 45, and the third switch group 54 (the third switches 54A to 54D). The operation of the power receiver 20D is described below, while focusing on the switching over of each switch.

First, the power received by the secondary-side coil 21L from the power transmitter 10B is stored in the capacitor 43 (an example of a power storage section) provided at the post stage of the rectifying section 22A. It is possible to flow a larger current or to extend time to flow a current as an electrostatic capacitance of the capacitor is larger.

However, when the capacitor 43 having a large electrostatic capacitance is provided at the post stage of the rectifying section 22A, failure may occur at the time of communication between the power receiver 20D and the power transmitter 10B. Therefore, control may be desirably performed using the first switch 44. Specifically, a drain and a source of the first switch 44 are conducted only at the time of the Q-value measurement to electrically connect the capacitor 43, thereby eliminating adverse effect of the capacitor 43.

When the current consumed by the Q-value measurement circuit 33A is small to some extent and the time necessary for the Q-value measurement is short, it is possible to measure the Q-value while a carrier signal from the power transmitter 10B is stopped. Incidentally, when the carrier signal output from the power transmitter 10B is stopped (at the time of the Q-value measurement), it is necessary to electrically disconnect the load 29 from the Q-value measurement circuit 33A certainly. For example, a P-channel MOSFET may be used as the second switch 45 to perform control in which the second switch 45 is turned off when a carrier signal is input to the power receiver 20D or control may be performed using an enable function of the first regulator 41. When the capacitor 43 is charged or when communication is performed through the communication section 32, the load 29 is not necessarily disconnected from the Q-value measurement circuit 33A.

To measure the Q-value, the voltage values on both ends of the resonance capacitor 21C1 are measured similarly to a known method of an LCR meter. More specifically, the third switches 54A to 54D are turned on at a timing of stopping the carrier signal, and the Q-value is calculated from two voltage waveforms (the voltages V1 and V2) that are obtained by rectifying a sine wave output from the AC power source 70 and are detected on the first end and the second end of the resonance capacitor 21C1.

The power receiver 20D illustrated in FIG. 8 charges the capacitor 43 in every Q-value measurement. The Q-value measurement circuit 33A is driven by the charged power, making it possible to measure the Q-value without using a secondary-side battery when power feeding is not performed from the primary side to the secondary side. Therefore, a large battery for Q-value measurement and a complicated circuit for controlling the power are not necessary on the secondary side, and downsizing, weight saving, and cost reduction of mobile devices are expected. In addition, appropriate switching of the third switches 54A to 54D in power feeding and Q-value measurement prevents interference between the feeding signal fed from the primary side and a measurement signal (a sine wave signal) output from the secondary-side AC power source used for the Q-value measurement, and thus it is possible to calculate a Q-value with high accuracy.

4. Fourth Embodiment

FIG. 9 is a block diagram illustrating a circuit configuration example of a non-contact power transmission system according to a fourth embodiment of the disclosure. A non-contact power transmission system 1E illustrated in FIG. 9 includes the power transmitter 10B and a power receiver 20E that is configured by further providing a temperature detection section 34 to the power receiver 20C illustrated in FIG. 7. The power receiver 20E performs the received-power voltage control according to the temperature of the secondary-side coil 21L measured using the temperature detection section 34. Other configurations are the same as those in the power receiver 20B.

The temperature detection section 34 is disposed in proximity to the secondary-side coil 21L in the power receiver 20E. The temperature detection section 34 detects the temperature of the secondary-side coil 21L, and outputs the detection result to the parameter measurement section 33. The parameter measurement section 33 informs the control section 30 of information of the temperature of the secondary-side coil 21L based on the detection result by the temperature detection section 34. The temperature detection section 34 may be realized by a temperature detection circuit using a thermistor, for example.

The control section 30 uses the temperature detection section 34 to monitor the temperature of the secondary-side coil 21L at regular intervals. When the temperature of the secondary-side coil 21L exceeds a predetermined threshold temperature, the temperature characteristics such as a heat dissipation condition and external temperature may be severer than expected. In such a case, heat generation by the secondary-side coil 21L may be suppressed by increasing the target voltage of the secondary-side voltage to decrease the secondary-side current. Therefore, the target voltage is increased, and the temperature of the secondary-side coil 21L is measured again after a given time is elapsed. At this time, if the temperature of the secondary-side coil 21L is lower than the previous temperature, the power feeding may be performed depending on the voltage because the heat generation of the secondary-side coil 21L is reduced through lowering of the secondary-side voltage. If the temperature of the secondary-side coil 21L is higher than the pervious temperature, it is conceivable that the main factor of the heat generation is not the current flowing through the secondary-side coil 21L.

FIG. 10 illustrates an example of a temperature detection circuit using a thermistor. In this example, a thermistor 34A and a resistor 34B are connected in series, one end of the thermistor 34A is connected to a power line, and one end of the resistive element 34B is connected to a ground terminal. A voltage VDD is applied to the temperature detection circuit, and a voltage Vout output from a connection midpoint between the thermistor 34A and the resistive element 34B at this time is measured. A thermistor has characteristics that variation of the resistance value is determined by the temperature. Therefore, the resistance value of the thermistor 34A is determined by measuring the voltage Vout in FIG. 5, and the temperature of the thermistor 34A is allowed to be detected. The detection result may be output as an analog signal from the temperature detection section 34 to the parameter measurement section 33, or may be converted into a digital signal by the temperature detection section 34 and then be output to the parameter measurement section 33.

To measure the temperature of the secondary-side coil 21L, the thermistor 34A is disposed as close to the secondary-side coil 21L as possible. For example, the thermistor 34A may be disposed in contact with a part of the secondary-side coil 21L so that accurate temperature of the secondary-side coil 21L is obtained.

As the thermistor 34A, a negative temperature coefficient (NTC) thermistor having characteristics of negative temperature coefficient or a positive temperature coefficient (PTC) thermistor having characteristics of positive temperature coefficient may be used. Further, a critical temperature resistor (CTR) thermistor whose resistance value drastically decreases when temperature thereof exceeds certain temperature may be used.

Incidentally, although a method of using a thermistor is employed in this example in order to measure the temperature of a coil, a method of measuring the temperature using atmospheric pressure, a method of measuring the temperature using an infrared ray, or other generally known methods may be used.

FIG. 11 is a flowchart illustrating received-power voltage control in the non-contact power transmission system 1E in FIG. 9. First, the received-power voltage control in FIG. 4 (the first embodiment) or in FIG. 6 (the second embodiment) is applied to the non-contact power transmission system 1E, and the power receiver 20E completes an adjustment process to the target voltage (step S51).

Next, the control section 30 of the power receiver 20E receives power from the power transmitter 10B in a non-contact manner to perform charging on the load 29 with the adjusted target voltage for a certain period (step S52).

The control section 30 determines whether the charging of the load 29 is completed (step S53). When it is determined that the charging is completed, the control section 30 performs a charging completion process (step S54) to terminate the processing of the received-power voltage control.

On the other hand, when it is determined that the charging of the load 29 is not completed in the determination process at step S52, the control section 30 uses the temperature detection section 34 to measure the temperature of the secondary-side coil 21L, thereby acquiring a measured value C (step S55).

Then, the determination section 30b of the control section 30 determines whether the measured value C of the temperature of the secondary-side coil 21L is lower than a preset threshold that is stored in the memory 31 (step S56). When it is determined that the measured value C of the temperature of the secondary-side coil 21L is lower than the threshold, the control section 30 returns to the process at step S52 to charge the load 29 for a certain period.

On the other hand, when it is determined that the measured value C of the temperature of the secondary-side coil 21L is equal to or higher than the preset threshold in the determination process at step S56, the target voltage value calculation section 30a of the control section 30 raises the target voltage value (step S57). The degree of raise at this time is arbitrarily set within a range not affecting the voltage adjustment processing by the voltage adjustment section 30c. Then, the voltage adjustment section 30c of the control section 30 adjusts the secondary-side voltage to the target voltage according to the voltage adjustment processing illustrated in FIG. 5.

After the voltage adjustment processing by the voltage adjustment section 30c, the control section 30 receives power from the power transmitter 10B in a non-contact manner to charge the load 29 with the adjusted target voltage for a certain period (step S58).

After charging is performed for a certain period, the control section 30 uses the temperature detection section 34 to measure the temperature of the secondary-side coil 21L again, thereby acquiring a measured value D (step S59).

Then, the determination section 30b of the control section 30 determines whether the measured value D of the temperature of the secondary-side coil 21L is lower than the previous measured value C (step S60). When it is determined that the measured value D of the temperature of the secondary-side coil 21L is lower than the previous measured value C, the control section 30 returns to the process at step S52 to charge the load 29 for a certain period additionally.

On the other hand, when it is determined that the measured value D of the temperature of the secondary-side coil 21L is equal to or higher than the previous measured value C in the determination process at step S60, the determination section 30b of the control section 30 performs a process to forcibly terminate the received-power voltage control (step S61).

According to the fourth embodiment as described above, the configuration of monitoring the temperature of the secondary-side coil is applied to any of the first to third embodiments, and thus it is possible to enhance safety of the power receiver.

Other Embodiments

The above-described example embodiments of the technology of the present disclosure are each applicable to a non-contact power transmission system of a magnetic resonance method, in addition to a non-contact power transmission system of an electromagnetic induction method.

Moreover, in the voltage adjustment processing (FIG. 5) in the first embodiment descried above, the power receiver requests the power transmitter to increase or decrease transmitted power through communication. However, the configuration is not limited to this example. For example, a configuration in which a capacitor configuring the resonance circuit of the power receiver is switched over to vary the capacitance value, and thus the secondary-side voltage is actively brought close to the target voltage value on the power receiver side may be employed.

Furthermore, in the above-described first to fourth embodiments, the configuration in which information such as parameters and thresholds necessary for the received-power voltage control is stored in the memory 31 of the power receiver has been described. However, the information may be stored in a memory provided on the power transmitter, and the power receiver may appropriately read the information.

Note that the series of processes in the above-described embodiments is allowed to be executed by hardware. However, software may execute a part of the series of processes. When a part of the series of processes is executed by software, the part of the series of processes is allowed to be executed by a computer in which programs configuring the software are incorporated in a dedicated hardware, or a computer in which programs for executing respective functions are installed. For example, programs configuring desired software may be installed in a general-purpose personal computer or the like and may be executed by the computer.

In addition, a recording medium in which program codes of software realizing the functions of the above-described embodiments are recorded may be provided to a system or a device. Moreover, it is needless to say that the system or a computer of the device (or a control device such as CPU) may read and execute the program codes stored in the recording medium (such as a memory) to realize the functions.

Examples of the recording medium for providing the program codes in this case may include, for example, a flexible disk, a hard disk, an optical disc, a magneto-optical disk, CD-ROM, CD-R, magnetic tape, a nonvolatile memory card, and ROM.

The computer executes the read program codes to achieve the functions of the above-described embodiments. In addition, based on instructions of the program codes, OS working on the computer and the like execute a part or all of the actual processing. This includes the case where the functions of the above-described embodiments are realized by the processing.

In addition, in the present specification, the process steps describing time sequential processes include the processes executed time-sequentially along the described order as well as processes that is not necessarily executed time-sequentially but executed in parallel or independently (for example, parallel processing or processing by an object).

As described above, the disclosure is not limited to the above-described respective embodiments, and it should be understood that other various modifications and applications may occur as they are within the scope of the appended claims or the equivalents thereof. In other words, the examples of the above-described respective embodiments are preferred specific examples of the present disclosure, and are therefore given various preferred limitations from the technical viewpoint. However, the technical scope of the present disclosure is never limited thereto particularly unless otherwise description for restriction thereto of the present disclosure in the explanation. For example, the used materials and the used amount thereof, the process time, the process order, and the numerical condition of each parameter that are described in the above-described explanation are merely preferred examples, and the dimensions, the shapes, and the positional relationship in the drawings used for the explanation are also schematic examples.

Note that the disclosure may be configured as follows.

(1) A device configured to receive power, the device comprising:
a coil having a resistance; and
at least one circuit configured to:
calculate a target voltage value based on an amount of power received by the device and the resistance of the coil, and
control received power voltage based on the calculated target voltage value.

(2) The device of (1), wherein the at least one circuit is configured to control the received power voltage at least in part by:
determining whether the calculated target voltage value exceeds a threshold; and
terminating control of the received power voltage, when it is determined that the calculated target voltage value exceeds the threshold.

(3) The device of any of (1)-(2), wherein the at least one circuit is configured to control the received power voltage at least in part by:
requesting a change in an amount of power transmitted to the device, when it is determined that the received power voltage is not equal to the target voltage value.

(4) The device of any of (1)-(3), wherein requesting the change in the amount of power comprises:
requesting an increase in the amount of power transmitted to the device, when it is determined that the received power voltage is less than the target voltage value.

(5) The device of any of (1)-(4), wherein requesting the change in the amount of power comprises:
requesting a decrease in the amount of power transmitted to the device, when it is determined that the received power voltage is greater than the target voltage value.

(6) The device of any of (1)-(5), wherein requesting the change in the amount of power transmitted to the device comprises:
transmitting, to a second device, a request to change the amount of power transmitted by the second device to the device.

(7) The device of any of (1)-(6), wherein transmitting the request to change the amount of power comprises transmitting information to the second device by using amplitude modulation.

(8) The device of any of (1)-(7), wherein the at least one circuit is further configured to:
measure temperature of the coil; and
control the received power voltage further based on the measured temperature.

(9) The device of any of (1)-(8), wherein the at least one circuit is configured to control the received power voltage at least in part by:
determining whether the measured temperature is less than a threshold temperature; and
increasing the target voltage value, when it is determined that the measured temperature is less than the threshold temperature.

(10) The device of any of (1)-(9), wherein the at least one circuit is configured to calculate the target voltage value so as to achieve a specified power transmission efficiency between the coil and a second coil magnetically coupled to the coil.

(11) The device of any of (1)-(10), wherein the at least one circuit is configured to calculate the target voltage value by:
calculating a load resistance value based, at least in part, on the resistance of the coil; and
calculating the target voltage value using the calculated load resistance value and the amount of power received by the device.

(12) The device of any of (1)-(11), wherein calculating the load resistance value comprises calculating the load resistance value according to:

$$R_L = R\sqrt{1+(kQ)^2}$$

where $R_L$ is the load resistance value, R is the resistance of the coil, k is a coupling coefficient between the coil and the second coil, and Q is a geometric mean of Q values for the coil and the second coil.

(13) The device of any of (1)-(12), further comprising:
rectifying circuitry configured to generate a rectified signal by rectifying an alternating-current signal obtained at least in part by using the coil.

(14) The device of any of (1)-(13), further comprising:
a low dropout regulator configured to generate voltage based on the rectified signal.

(15) The device of any of (1)-(14), further comprising:
a charge control circuit,
wherein the low dropout regulator is configured to supply the generated voltage to the charge control circuit.

(16) The device of any of (1)-(15), further comprising a DC-DC converter configured to perform voltage conversion based on the rectified signal.

(17) The device of any of (1)-(16), further comprising:
a charge control circuit,
wherein the DC-DC converter is configured to supply voltage to the charge control circuit.

(18) The device of any of (1)-(17), further comprising:
a resonance capacitor connected in series with the coil.

(19) A method for use in connection with receiving power using a device comprising a coil, the coil having a resistance, the method comprising:
using at least one circuit to:
calculate a target voltage value based on an amount of power received by the device and the resistance of the coil, and
control received power voltage based on the calculated target voltage value.

(20) A system comprising:
a first device configured to transmit power; and
a second device configured to receive power from the first device, the second device comprising:
a coil having a resistance; and
at least one circuit configured to:
calculate a target voltage value based on an amount of power received by the second device and the resistance of the coil, and
control received power voltage based on the calculated target voltage value.

Some embodiments may comprise a non-transitory computer readable storage medium (or multiple non-transitory computer readable media) (e.g., computer memory, one or more floppy discs, compact discs (CD), optical discs, digital video disks (DVD), magnetic tapes, flash memories, circuit configurations in Field Programmable Gate Arrays or other semiconductor devices, or other tangible computer storage media) encoded with one or more programs (e.g., a plurality of processor-executable instructions) that, when executed on one or more computers or other processors, perform methods that implement the various embodiments discussed above. As is apparent from the foregoing examples, a non-transitory computer-readable storage medium may retain information for a sufficient time to provide computer executable instructions in a non-transitory form.

Note that the disclosure may be configured as follows further.

(1)
A power receiver including:
a resonance circuit including a secondary-side coil, the secondary-side coil being configured to be magnetically coupled with a primary-side coil to receive power from the primary-side coil in a non-contact manner;
a rectifying section configured to rectify the power received by the resonance circuit;
a voltage stabilizing section configured to use the power rectified by the rectifying section to output a stabilized predetermined voltage; and
a control section configured to determine a target voltage value of a voltage to be supplied from the rectifying section to the voltage stabilizing section, based on a resistance value of the secondary-side coil and the received power, in receiving the power from the primary-side coil in the non-contact manner.

(2)
The power receiver according to (1), wherein the control section determines the target voltage value to allow a product of the resistance value of the secondary-side coil and a square of a secondary-side current value to be equal to or lower than a predetermined first threshold, the secondary-side current value being a value of a current supplied from the rectifying section.

(3)
The power receiver according to (1) or (2), wherein the control section adjusts a load resistance value in the power receiver to minimize a total loss generated between the primary-side coil and the secondary-side coil.

(4)
The power receiver according to (3), wherein an optimum load resistance value $R_{Lopt}$ on the secondary side minimizing the total loss generated between the primary-side coil and the secondary-side coil, is represented by the following expression:

$$R_{Lopt}=R_2\sqrt{(1+(kQ)^2)}$$

where $R_2$ is the resistance value of the secondary-side coil, k is a coupling coefficient between the primary-side coil and the secondary-side coil, and Q is a geometric mean of a Q-value of the primary-side coil and a Q-value of the secondary-side coil.

(5)
The power receiver according to (2), wherein the load resistance value is adjusted, within a range in which the product of the resistance value of the secondary-side coil and the square of the secondary-side current value is equal to or lower than the first threshold, to minimize a total loss generated between the primary-side coil and the secondary-side coil.

(6)
The power receiver according to any one of (1) to (5), further including a temperature detection section configured to detect temperature of the secondary-side coil, wherein
the control section compares the temperature of the secondary-side coil detected by the temperature detection section with a predetermined second threshold, and when the temperature of the secondary-side coil exceeds the second threshold, the control section increases the target voltage value.

(7)
The power receiver according to any one of (1) to (6), further including a communication section configured to inform a power transmitter of the target voltage value determined by the control section, the power transmitter including the primary-side coil.

(8)
A non-contact power transmission system provided with a power transmitter configured to transmit power through a wireless line and a power receiver configured to receive the power from the power transmitter, the power receiver including:

a resonance circuit including a secondary-side coil, the secondary-side coil being configured to be magnetically coupled with a primary-side coil included in the power transmitter, and receiving the power from the primary-side coil in a non-contact manner;

a rectifying section configured to rectify the power received by the resonance circuit;

a voltage stabilizing section configured to use the power rectified by the rectifying section to output a stabilized predetermined voltage; and a control section configured to determine a target voltage value of a voltage to be supplied from the rectifying section to the voltage stabilizing section, based on a resistance value of the secondary-side coil and the received power, in receiving the power from the primary-side coil in the non-contact manner.

(9)

A method of controlling a received-power voltage, the method including:

rectifying, by a rectifying section, power received by a resonance circuit including a secondary-side coil, the secondary-side coil being magnetically coupled with a primary-side coil and receiving power from the primary-side coil in a non-contact manner;

outputting, by a voltage stabilizing section, a predetermined voltage stabilized using the power rectified by the rectifying section; and determining, by a control section, a target voltage value of a voltage to be supplied from the rectifying section to the voltage stabilizing section, based on a resistance value of the secondary-side coil and the received power, in receiving the power from the primary-side coil in the non-contact manner.

It should be understood by those skilled in the art that various modifications, combinations, sub-combinations and alterations may occur depending on design requirements and other factors insofar as they are within the scope of the appended claims or the equivalents thereof.

Use of ordinal terms such as "first," "second," "third," etc., in the claims to modify a claim element does not by itself connote any priority, precedence, or order of one claim element over another or the temporal order in which acts of a method are performed. Such ordinal terms are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as one or multiple additional items.

REFERENCE SIGNS LIST 1B, 1C, 1D, 1E Non-contact power transmission system
10B Power transmitter (primary-side unit)
13 Transmission driver
14 Resonance circuit
14C Resonance capacitor
14L Primary-side coil
15 Control section
16 Communication section
20B, 20C, 20D, 20E Power receiver (secondary-side unit)
21B Resonance circuit
21C1, 21C2 Resonance capacitor
21L Secondary-side coil
22A Rectifying section
26 Voltage detection section
28 Regulator
29 Load
30 Control section
30a Voltage value calculation section
30b Determination section
30c Voltage adjustment section
31 Memory
32 Communication section
33 Parameter measurement section
33A Q-value measurement circuit
34 Temperature detection section

The invention claimed is:

1. A first device configured to receive power, the first device comprising:
a first coil having a resistance;
rectifying circuitry configured to generate a rectified signal based on rectification of an alternating-current signal received by the first coil;
a voltage detection section configured to detect a received power voltage of the rectified signal; and
at least one circuit configured to:
calculate a target voltage value of a first voltage to be supplied from the rectifying circuitry, wherein the target voltage value is calculated based on an amount of the power received by the first device and the resistance of the first coil; and
control the detected received power voltage to be equal to the calculated target voltage value.

2. The first device of claim 1, wherein the at least one circuit is further configured to:
determine whether the calculated target voltage value exceeds a threshold; and
terminate the control of the detected received power voltage, in response to the determination that the calculated target voltage value exceeds the threshold.

3. The first device of claim 1, wherein the at least one circuit is further configured to:
request a change in an amount of power transmitted to the first device, based on a determination that the detected received power voltage is different from the calculated target voltage value.

4. The first device of claim 3, wherein the at least one circuit is further configured to:
request an increase in the amount of the power transmitted to the first device, based on a determination that the detected received power voltage is less than the calculated target voltage value.

5. The first device of claim 3, wherein the at least one circuit is further configured to:
request a decrease in the amount of the power transmitted to the first device, based on a determination that the detected received power voltage is greater than the calculated target voltage value.

6. The first device of claim 3, wherein the at least one circuit is further configured to:
transmit, to a second device, the request to change the amount of the power transmitted to the first device.

7. The first device of claim 6, wherein the at least one circuit is further configured to:
transmit, to the second device, the request to change the amount of the power by amplitude modulation.

8. The first device of claim 1, wherein the at least one circuit is further configured to:
measure a temperature of the first coil; and
control the received power voltage based on the measured temperature.

9. The first device of claim 8, wherein the at least one circuit is further configured to:
   determine whether the measured temperature is less than a threshold temperature; and
   increase the target voltage value, based on the determination that the measured temperature is less than the threshold temperature.

10. The first device of claim 1, wherein the at least one circuit is further configured to calculate the target voltage value based on a specified power transmission efficiency between the first coil and a second coil magnetically coupled to the first coil.

11. The first device of claim 1, wherein the at least one circuit is further configured to:
    calculate a load resistance value based on the resistance of the first coil; and
    calculate the target voltage value based on the calculated load resistance value and the amount of the power received by the first device.

12. The first device of claim 11, wherein the at least one circuit is further configured to:
    calculate the load resistance value based on:

$$R_L = R\sqrt{(1+(kQ)^2)}$$

where $R_L$ is the load resistance value, R is the resistance of the first coil, k is a coupling coefficient between the first coil and a second coil magnetically coupled to the first coil, and Q is a geometric mean of Q values for the first coil and the second coil.

13. The first device of claim 1, further comprising:
    a low dropout regulator configured to generate a second voltage based on the rectified signal.

14. The first device of claim 13, further comprising:
    a charge control circuit,
    wherein the low dropout regulator is further configured to supply the generated second voltage to the charge control circuit.

15. The first device of claim 1, further comprising a DC-DC converter configured to convert a second voltage based on the rectified signal.

16. The first device of claim 15, further comprising:
    a charge control circuit, wherein the DC-DC converter is further configured to supply the second voltage to the charge control circuit.

17. The first device of claim 1, further comprising:
    a resonance capacitor connected in series with the first coil.

18. A method, comprising:
    in a device including a coil and configured to receive power:
       generating, by rectifying circuitry, a rectified signal based on rectification of an alternating-current signal received by the coil;
       detecting, by a voltage detection section, a received power voltage of the rectified signal;
       calculating, using a circuit, a target voltage value of a voltage to be supplied from the rectifying circuitry, wherein the target voltage value is calculated based on an amount of the power received by the device and a resistance of the coil, and
       controlling, using the circuit, the detected received power voltage to be equal to the calculated target voltage value.

19. A system, comprising:
    a first device configured to transmit power; and
    a second device configured to receive the power from the first device, the second device comprises:
    a coil having a resistance;
    rectifying circuitry configured to generate a rectified signal based on rectification of an alternating-current signal received by the coil;
    a voltage detection section configured to detect a received power voltage of the rectified signal; and
    at least one circuit configured to:
       calculate a target voltage value of a voltage to be supplied from the rectifying circuitry, wherein the target voltage value is calculated based on an amount of the power received by the second device and the resistance of the coil, and
       control the detected received power voltage to be equal to the calculated target voltage value.

* * * * *